United States Patent
Huh et al.

(10) Patent No.: US 12,411,320 B2
(45) Date of Patent: Sep. 9, 2025

(54) IMAGING LENS SYSTEM

(71) Applicant: SAMSUNG ELECTRO-MECHANICS CO., LTD., Suwon-si (KR)

(72) Inventors: Jae Hyuk Huh, Suwon-si (KR); You Jin Jeong, Suwon-si (KR); Byung Hyun Kim, Suwon-si (KR); So Mi Yang, Suwon-si (KR)

(73) Assignee: Samsung Electro-Mechanics Co., Ltd., Suwon-si (KR)

( * ) Notice: Subject to any disclaimer, the term of this patent is extended or adjusted under 35 U.S.C. 154(b) by 0 days.

(21) Appl. No.: 18/361,662

(22) Filed: Jul. 28, 2023

(65) Prior Publication Data

US 2024/0176115 A1 May 30, 2024

(30) Foreign Application Priority Data

Nov. 24, 2022 (KR) ............... 10-2022-0159542
Mar. 21, 2023 (KR) ............... 10-2023-0036440

(51) Int. Cl.
*G02B 13/00* (2006.01)
*G02B 9/60* (2006.01)

(52) U.S. Cl.
CPC ........... *G02B 13/0065* (2013.01); *G02B 9/60* (2013.01); *G02B 13/0045* (2013.01)

(58) Field of Classification Search
CPC ........... G02B 13/0045; G02B 13/0065; G02B 6/4213; G02B 6/4206; G02B 6/4204; G02B 6/4203; G02B 6/4202; G02B 6/4201; G02B 6/0011; G02B 6/0096; G02B 6/10; G02B 6/00; G02B 6/4214; G02B 6/42; G02B 6/26; G02B 6/24; G02B 5/04; G02B 9/60
USPC ....... 359/489.09, 431, 211.3, 207.8, 332, 34, 359/496, 678, 670, 640, 638, 598, 746
See application file for complete search history.

(56) References Cited

U.S. PATENT DOCUMENTS

| | | | | |
|---|---|---|---|---|
| 3,484,149 | A * | 12/1969 | Helmut | G02B 7/28 359/414 |
| 11,921,266 | B2 | 3/2024 | Jung et al. | |
| 2001/0046085 | A1 * | 11/2001 | Boys | G02B 7/06 359/410 |
| 2016/0216490 | A1 * | 7/2016 | Chen | G02B 5/208 |
| 2018/0059376 | A1 * | 3/2018 | Lin | G02B 13/0045 |

(Continued)

FOREIGN PATENT DOCUMENTS

| | | |
|---|---|---|
| CN | 113219628 A | 8/2021 |
| CN | 114815164 A | 7/2022 |

(Continued)

OTHER PUBLICATIONS

Original and translation 18361662 (Year: 2019).*

(Continued)

*Primary Examiner* — Travis S Fissel
(74) *Attorney, Agent, or Firm* — NSIP Law

(57) ABSTRACT

An imaging lens system includes a lens group including a plurality of lenses, and an optical path folding member disposed on an image side of the lens group, wherein $-1.2 < fR/PL < -0.40$, where fR is a focal length of a rearmost lens disposed closest to an imaging plane in the lens group, and PL is a distance from an incident surface of the optical path folding member to an exit surface of the optical path folding member.

19 Claims, 11 Drawing Sheets

(56) References Cited

U.S. PATENT DOCUMENTS

| | | | |
|---|---|---|---|
| 2018/0143403 A1* | 5/2018 | Tseng | ................ G02B 13/0065 |
| 2020/0333561 A1 | 10/2020 | Liu et al. | |
| 2021/0063703 A1 | 3/2021 | Byun et al. | |
| 2021/0096328 A1* | 4/2021 | Wang | .................. G02B 13/004 |
| 2021/0199936 A1 | 7/2021 | Dai et al. | |
| 2021/0278633 A1 | 9/2021 | Tseng et al. | |
| 2021/0364751 A1 | 11/2021 | Huh et al. | |
| 2022/0066175 A1 | 3/2022 | Wu et al. | |
| 2022/0091373 A1* | 3/2022 | Saiga | .................... G02B 13/02 |
| 2022/0171168 A1* | 6/2022 | Jung | .................... G02B 15/16 |
| 2022/0187578 A1 | 6/2022 | Yeh et al. | |
| 2022/0229271 A1 | 7/2022 | Tseng et al. | |
| 2022/0244495 A1 | 8/2022 | Yeh et al. | |
| 2022/0308319 A1 | 9/2022 | Chen | |
| 2022/0311917 A1 | 9/2022 | Yang et al. | |

FOREIGN PATENT DOCUMENTS

| | | | |
|---|---|---|---|
| JP | 2020-514810 A | 5/2020 | |
| KR | 10-2021-0043670 A | 4/2021 | |
| KR | 10-2022-0076109 A | 6/2022 | |
| KR | 10-2437800 B1 | 8/2022 | |
| KR | 10-2022-0132961 A | 10/2022 | |
| TW | 202109126 A | 3/2021 | |
| TW | 202223524 A | 6/2022 | |
| WO | WO 2018/165123 A1 | 9/2018 | |
| WO | WO 2020/068594 A1 | 4/2020 | |

OTHER PUBLICATIONS

Korean Office Action issued on Oct. 26, 2023, in counterpart Korean Patent Application No. 10-2023-0036440 (5 pages in English, 5 pages in Korean).

Taiwanese Office Action issued on Feb. 6, 2024, in counterpart Taiwanese Patent Application No. 112129960 (4 pages in English, 5 pages in Chinese).

Korean Office Action Issued on Feb. 27, 2024, in counterpart Korean Patent Application No. 10-2023-0036440 (4 pages in English, 4 pages in Korean).

Taiwanese Office Action issued on Aug. 12, 2024, in counterpart Taiwanese Patent Application No. 113123378 (5 pages in English, 4 pages in Chinese).

United States Office Action Issued on Mar. 26, 2025, in Counterpart U.S. Appl. No. 18/763,174 (8 Pages in English).

Korean Office Action Issued on Jun. 11, 2025, in Counterpart Korean Patent Application No. 10-2023-0187820 (8 Pages in English, 7 Pages in Korean).

* cited by examiner

IMAGING LENS SYSTEM

CROSS-REFERENCE TO RELATED APPLICATIONS

This application claims the benefit under 35 USC 119(a) of Korean Patent Application Nos. 10-2022-0159542 filed on Nov. 24, 2022, and 10-2023-0036440 filed on Mar. 21, 2023, in the Korean Intellectual Property Office, the entire disclosures of which are incorporated herein by reference for all purposes.

BACKGROUND

1. Field

The present disclosure relates to a telephoto imaging lens system which may be mounted on a portable electronic device.

2. Description of the Background

It may not be easy for an imaging lens system (a telephoto imaging lens system) having a long focal length to have a smaller thickness and size, and it may thus be difficult for the system to be mounted in a small terminal. However, there has been an increasing demand for functional improvement and performance improvement of the small terminal, for example, a smartphone, which results in an increasing need to mount the telephoto imaging lens system in the small terminal.

The above information is presented as background information only to assist with an understanding of the present disclosure. No determination has been made, and no assertion is made, as to whether any of the above might be applicable as prior art with regard to the disclosure.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one general aspect, an imaging lens system includes a lens group including a plurality of lenses, and an optical path folding member disposed on an image side of the lens group, wherein $-1.2 < fR/PL < -0.40$, where fR is a focal length of a rearmost lens disposed closest to an imaging plane in the lens group, and PL is a distance from an incident surface of the optical path folding member to an exit surface of the optical path folding member.

The conditional expression $0.80 < f/PL < 2.0$ may be satisfied, where f is a focal length of the imaging lens system.

The conditional expression $0.80 < (|fF|+|fR|)/PL < 2.40$ may be satisfied, where fF is a focal length of a frontmost lens disposed closest to an object in the lens group.

The conditional expression $0.40 < fF/PL < 1.0$ may be satisfied.

The conditional expression $0.20 < LFS1/PL < 0.60$ may be satisfied, where LFS1 is a radius of curvature of an object-side surface of a frontmost lens disposed closest to an object in the lens group.

The conditional expression $0.20 < LRS2/PL < 0.60$ may be satisfied, where LRS2 is a radius of curvature of an image-side surface of the rearmost lens disposed closest to the imaging plane in the lens group.

The conditional expression $0.40 < (LFS1+LRS2)/PL < 0.90$ may be satisfied.

The conditional expression $0.10 < TLG/PL < 0.40$ may be satisfied, where TLG is a distance from an object-side surface of a frontmost lens disposed closest to an object in the lens group to an image-side surface of the rearmost lens disposed closest to the imaging plane in the lens group.

The conditional expression $1.05 < TTL/f$ may be satisfied, where TTL is a distance from an object-side surface of a frontmost lens disposed closest to an object in the lens group to the imaging plane.

An electronic device may include one or more camera modules, wherein at least one of the one or more camera modules may include the imaging lens system.

In another general aspect, an imaging lens system includes a lens group including a first lens, a second lens, a third lens, a fourth lens, and a fifth lens sequentially disposed from an object side toward an imaging plane; and an optical path folding member disposed on an image side of the lens group and including four or more reflective surfaces.

The conditional expression $0.5 < f1/PL < 0.9$ may be satisfied, where f1 is a focal length of the first lens and PL is a distance from an incident surface of the optical path folding member to an exit surface of the optical path folding member.

The conditional expression $-0.86 < f5/PL < -0.46$ may be satisfied, where f5 is a focal length of the fifth lens.

The conditional expression $-0.40 < (f1+f2)/PL < -0.10$ may be satisfied, where f1 is a focal length of the first lens and f2 is a focal length of the second lens.

The conditional expression $0.60 < (f1+f2+f3)/PL < 1.20$ may be satisfied, where f3 is a focal length of the third lens.

The conditional expression $1.60 < (f1+f2+f3+f4)/PL < 2.60$ may be satisfied, where f4 is a focal length of the fourth lens.

The conditional expression $1.60 < (f1+f2+f3+f4+f5)/PL < 2.0$ may be satisfied, where f5 is a focal length of the fifth lens.

In another general aspect, an imaging lens system includes a lens group including a first lens, a second lens, a third lens, a fourth lens having positive refractive power, and a fifth lens having negative refractive power sequentially disposed from an object side toward an imaging plane, and an optical path folding member disposed on an image side of the lens group, wherein $0.7 < BFL/TTL$, where BFL is a distance from the image-side surface of the fifth lens to the imaging plane and TTL is a distance from an object-side surface of the first lens to the imaging plane.

Other features and aspects will be apparent from the following detailed description, the drawings, and the claims.

BRIEF DESCRIPTION OF DRAWINGS

Throughout the drawings and the detailed description, the same reference numerals refer to the same elements. The drawings may not be to scale, and the relative size, proportions, and depiction of elements in the drawings may be exaggerated for clarity, illustration, and convenience.

DETAILED DESCRIPTION

Figure 1:
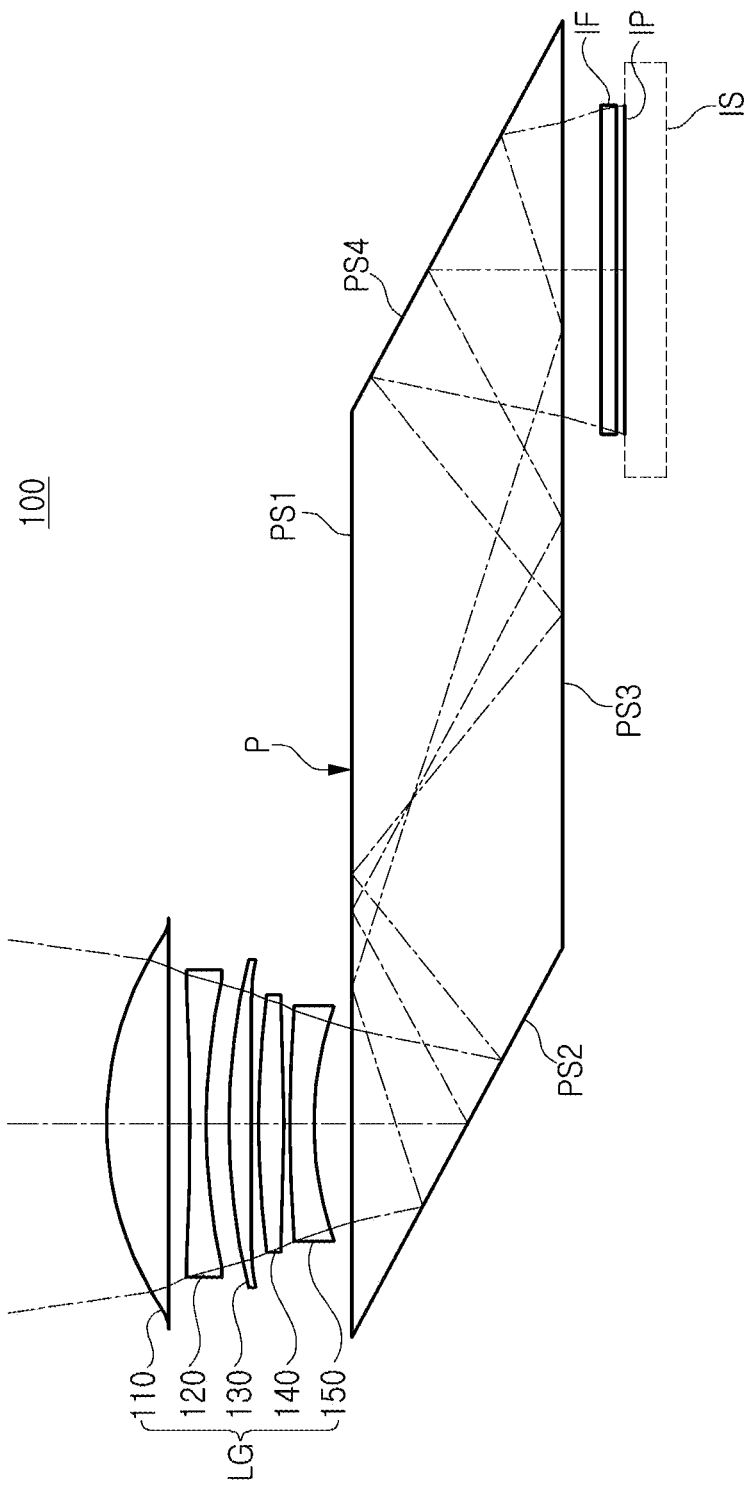
FIG. 1 is a configuration diagram of an imaging lens system according to a first example embodiment.

Hereinafter, while examples of the present disclosure will be described in detail with reference to the accompanying drawings, it is noted that examples are not limited to the same.

The following detailed description is provided to assist the reader in gaining a comprehensive understanding of the methods, apparatuses, and/or systems described herein. However, various changes, modifications, and equivalents of the methods, apparatuses, and/or systems described herein will be apparent after an understanding of this disclosure. For example, the sequences of operations described herein are merely examples, and are not limited to those set forth herein, but may be changed as will be apparent after an understanding of this disclosure, with the exception of operations necessarily occurring in a certain order. Also, descriptions of features that are known in the art may be omitted for increased clarity and conciseness.

The features described herein may be embodied in different forms, and are not to be construed as being limited to the examples described herein. Rather, the examples described herein have been provided merely to illustrate some of the many possible ways of implementing the methods, apparatuses, and/or systems described herein that will be apparent after an understanding of this disclosure.

Throughout the specification, when an element, such as a layer, region, or substrate is described as being "on," "connected to," or "coupled to" another element, it may be directly "on," "connected to," or "coupled to" the other element, or there may be one or more other elements intervening therebetween. In contrast, when an element is described as being "directly on," "directly connected to," or "directly coupled to" another element, there can be no other elements intervening therebetween.

As used herein, the term "and/or" includes any one and any combination of any two or more of the associated listed items; likewise, "at least one of" includes any one and any combination of any two or more of the associated listed items.

Although terms such as "first," "second," and "third" may be used herein to describe various members, components, regions, layers, or sections, these members, components, regions, layers, or sections are not to be limited by these terms. Rather, these terms are only used to distinguish one member, component, region, layer, or section from another member, component, region, layer, or section. Thus, a first member, component, region, layer, or section referred to in examples described herein may also be referred to as a second member, component, region, layer, or section without departing from the teachings of the examples.

Spatially relative terms, such as "above," "upper," "below," "lower," and the like, may be used herein for ease of description to describe one element's relationship to another element as shown in the figures. Such spatially relative terms are intended to encompass different orientations of the device in use or operation in addition to the orientation depicted in the figures. For example, if the device in the figures is turned over, an element described as being "above," or "upper" relative to another element would then be "below," or "lower" relative to the other element. Thus, the term "above" encompasses both the above and below orientations depending on the spatial orientation of the device. The device may also be oriented in other ways (rotated 90 degrees or at other orientations), and the spatially relative terms used herein are to be interpreted accordingly.

The terminology used herein is for describing various examples only, and is not to be used to limit the disclosure. The articles "a," "an," and "the" are intended to include the plural forms as well, unless the context clearly indicates otherwise. The terms "comprises," "includes," and "has" specify the presence of stated features, numbers, operations, members, elements, and/or combinations thereof, but do not preclude the presence or addition of one or more other features, numbers, operations, members, elements, and/or combinations thereof.

Due to manufacturing techniques and/or tolerances, variations of the shapes shown in the drawings may occur. Thus, the examples described herein are not limited to the specific shapes shown in the drawings, but include changes in shape that occur during manufacturing.

Herein, it is noted that use of the term "may" with respect to an example, for example, as to what an example may include or implement, means that at least one example exists in which such a feature is included or implemented while all examples are not limited thereto.

The features of the examples described herein may be combined in various ways as will be apparent after an understanding of this disclosure. Further, although the examples described herein have a variety of configurations, other configurations are possible as will be apparent after an understanding of this disclosure.

One or more examples of the present disclosure may provide a telephoto imaging lens system which has a long focal length and may be mounted in a small terminal.

In the specification, a first lens may indicate a lens closest to an object (or a subject). In addition, the number of lenses may indicate an order in which the lenses are disposed from an object side in an optical axis direction. For example, a second lens may indicate a lens disposed second from the object side, and the third lens may indicate a lens disposed third from the object side. In the specification, a radius of curvature of a lens, a thickness, a distance TTL from an object-side surface of the first lens to an imaging plane, a height ImgHT of the imaging plane, and a focal length are represented by millimeters (mm).

Each of the thickness of the lens, a distance between the lenses, the TTL and an incidence angle may be a dimension calculated based on an optical axis of the imaging lens system. Further, in a description for a shape of the lens, one convex surface of the lens may indicate that a paraxial region of a corresponding surface is convex, and one concave surface of the lens may indicate that the paraxial region of a corresponding surface is concave. Therefore, although it is described that one surface of the lens is convex, an edge portion of the lens may be concave. Likewise, although it is described that one surface of the lens is concave, the edge portion of the lens may be convex.

The imaging lens system described herein may be mounted in a portable electronic device. For example, the imaging lens system may be mounted in a smartphone (or a portable terminal), a laptop computer, an augmented reality device, a virtual reality (VR) device, a portable game machine, or the like. However, the usage range and usage example of the imaging lens system described herein may not be limited to the electronic device described above. For example, the imaging lens system may be applied to an electronic device which may require high-resolution imaging while providing a narrow mounting space.

The imaging lens system described herein may reduce an external size of the imaging lens system while securing a long rear focal length BFL (or a distance from an image-side surface of the rearmost lens to the imaging plane). For example, the imaging lens system described herein may reduce the external size of the imaging lens system while securing the BFL required for implementing a telephoto imaging lens system by using a reflecting member. For another example, the imaging lens system described herein may provide an imaging plane having a considerable size for implementation of high resolution. For yet another example, the imaging lens system described herein may have an integrated form to be mounted in the portable terminal while securing the long focal length or the long BFL.

In the specification, an optical path folding member may refer to any member which may allow light to be reflected. For example, the optical path folding member may collectively refer to all of a reflector, a prism, and the like. Therefore, in the specification, the reflector, the prism, and the optical path folding member may all refer to the same component or interchangeable components.

An imaging lens system according to a first aspect of the present disclosure may include a lens group and an optical path folding member. In the imaging lens system according to a first aspect, the lens group may include a plurality of lenses. For example, the lens group may include a first lens, a second lens, a third lens, and a fourth lens sequentially arranged from the object side. For another example, the lens group may include a first lens, a second lens, a third lens, a fourth lens, and a fifth lens sequentially arranged from the object side. However, the number of lenses included in the lens group is not limited to four or five lenses. In the imaging lens system according to a first aspect, the optical path folding member may have a considerable distance (PL) from an incident surface to an exit surface. For example, the PL of the optical path folding member may have a unique relationship with a focal length fR of the rearmost lens (or a lens disposed closest to the imaging plane in the lens group). As a specific example, the imaging lens system according to a first aspect may satisfy the following conditional expression:

$-1.2 < fR/PL < 0.4.$

An imaging lens system according to a second aspect of the present disclosure may include a lens group and an optical path folding member. In the imaging lens system according to a second aspect, the lens group may include a plurality of lenses. For example, the lens group may include a first lens, a second lens, a third lens, a fourth lens, and a fifth lens sequentially arranged from the object side. In the imaging lens system according to a second aspect, the optical path folding member may include a plurality of reflective surfaces. For example, the optical path folding member may include four or more reflective surfaces. As a specific example, the optical path folding member may include a first reflective surface, a second reflective surface, a third reflective surface, and a fourth reflective surface. The optical path folding member may include two total reflective surfaces and two or more regular reflective surfaces (or mirror reflective surfaces). For example, in the optical path folding member, the first and fourth reflective surfaces may be the total reflective surfaces, and the second and third reflective surfaces may be the regular reflective surfaces.

An imaging lens system according to a third aspect of the present disclosure may include a lens group and an optical path folding member. In the imaging lens system according to a third aspect, the lens group may include a plurality of lenses. For example, the lens group may include a first lens, a second lens, a third lens, a fourth lens, and a fifth lens sequentially arranged from the object side. In the imaging lens system according to a third aspect, the optical path folding member may include a plurality of reflective surfaces. For example, the optical path folding member may include four or more reflective surfaces. As a specific example, the optical path folding member may include a first reflective surface, a second reflective surface, a third reflective surface, and a fourth reflective surface. The optical path folding member may include an incident surface and an exit surface. The incident surface may be disposed closest to the lens group, and the exit surface may be disposed closest to the imaging plane. The optical path folding member may have the incident surface and the reflective surface integrally formed with each other. For example, the incident surface and the second reflective surface may be the same surface in the optical path folding member.

An imaging lens system according to a fourth aspect of the present disclosure may include a lens group and an optical path folding member. In the imaging lens system according to a fourth aspect, the lens group may include a plurality of lenses. For example, the lens group may include a first lens, a second lens, a third lens, a fourth lens, and a fifth lens sequentially arranged from the object side. In the imaging lens system according to a fourth aspect, the optical path folding member may include a plurality of reflective surfaces. For example, the optical path folding member may include four or more reflective surfaces. As a specific example, the optical path folding member may include a first reflective surface, a second reflective surface, a third reflective surface, and a fourth reflective surface. In the imaging lens system according to a fourth aspect, the reflective surfaces of the optical path folding member may have a unique geometrical relationship therebetween. For example, an angle between the first reflective surface and the second reflective surface may be 15 degrees to 30 degrees. For another example, an angle between the third reflective surface and the fourth reflective surface may be 15 degrees to 30 degrees.

An imaging lens system according to a fifth aspect of the present disclosure may include a lens group and an optical path folding member. In the imaging lens system according to a fifth aspect, the lens group may include a plurality of lenses. For example, the lens group may include a first lens, a second lens, a third lens, a fourth lens, and a fifth lens sequentially arranged from the object side. In the imaging lens system according to a fifth aspect, the optical path folding member may include a plurality of reflective surfaces. For example, the optical path folding member may include six or more reflective surfaces. As a specific example, the optical path folding member may include a first reflective surface, a second reflective surface, a third reflective surface, a fourth reflective surface, a fifth reflective surface, and a sixth reflective surface. The optical path folding member may include an incident surface and an exit surface. The incident surface may be disposed closest to the lens group, and the exit surface may be disposed closest to the imaging plane. The optical path folding member may have the incident surface and the reflective surface integrally formed with each other. For example, the incident surface, the second reflective surface, and the fourth reflective surface may be the same surface in the optical path folding member. For another example, exit surface, the third reflective surface, and the fifth reflective surface may be the same surface in the optical path folding member.

An imaging lens system according to a sixth aspect of the present disclosure may satisfy one or more of the following conditional expressions. However, not only the imaging lens system according to a sixth aspect may satisfy the following conditional expressions. For example, the imaging lens systems according to a first aspect to a fifth aspect described above may satisfy one or more of the following conditional expressions:

$0.7 < BFL/TTL$ $25 < V1-V2$ $10 \text{ mm} < f$ $1.05 < TTL/f.$

In the above conditional expressions, BFL is a distance from the image-side surface of the rearmost lens in the lens group to the imaging plane, TTL is a distance from the object-side surface of the frontmost lens (first lens) in the lens group to the imaging plane, V1 is an Abbe number of the first lens, V2 is an Abbe number of the second lens (lens closest to an image side of the first lens), and f is the focal length of the imaging lens system.

The imaging lens system according to the present disclosure may satisfy the above-described conditional expressions in more limited forms as follows:

$0.7 < BFL/TTL < 0.9$ $25 < V1-V2 < 32$ $12 \text{ mm} < f < 26 \text{ mm}$ $1.05 < TTL/f < 1.4.$ The imaging lens system according to the present disclosure may satisfy the above-described conditional expressions in a more limited form as follows:

$1.2 < TTL/f < 1.4.$

The imaging lens system according to a seventh aspect of the present disclosure may satisfy one or more of the following conditional expressions. However, not only the imaging lens system according to a seventh aspect may satisfy the following conditional expressions. For example, the imaging lens systems according to a first aspect to a sixth aspect described above may satisfy one or more of the following conditional expressions:

$0.80 < f/PL < 2.0$ $0.80 < (|fF|+|fR|)/PL < 2.40$ $0.40 < fF/PL < 1.0$ $-1.20 < fR/PL < -0.40$ $0.20 < LFS1/PL < 0.60$ $0.20 < LRS2/PL < 0.60$ $0.40 < (LFS1+LRS2)/PL < 0.90$ $0.10 < TLG/PL < 0.4$ $0.06 < ImgHT/PL < 0.20$ $1.20 < (TTL+ImgHT)/PL < 2.40$ $2.10 < (TTL+f)/PL < 4.10.$

In the above conditional expressions, PL is a distance from the incident surface to exit surface of the optical path folding member, fF is a focal length of the frontmost lens disposed closest to the object in the lens group, fR is a focal length of the rearmost lens disposed closest to the imaging plane in the lens group, LFS1 is a radius of curvature of the object-side surface of the frontmost lens, LRS2 is a radius of curvature of the image-side surface of the rearmost lens, TLG is a distance from the object-side surface of the frontmost lens to the image-side surface of the rearmost lens, and ImgHT is the height of the imaging plane.

The imaging lens system according to an eighth aspect of the present disclosure may satisfy one or more of the following conditional expressions. However, not only the imaging lens system according to an eighth aspect may satisfy the following conditional expressions. For example, the imaging lens systems according to a first aspect to a seventh aspect described above may satisfy one or more of the following conditional expressions:

$0.50 < f1/PL < 0.9$ $-0.86 < f5/PL < -0.46$ $-0.40 < (f1+f2)/PL < -0.10$ $0.60 < (f1+f2+f3)/PL < 1.20$ $1.60 < (f1+f2+f3+f4)/PL < 2.60$ $1.0 < (f1+f2+f3+f4+f5)/PL < 2.0$ $0.24 < R1/PL < 0.48$ $0.24 < R10/PL < 0.48$ $0.52 < (R1+R10)/PL < 0.96$ $0.19 < TLG/PL < 0.38$ $0.09 < ImgHT/PL < 0.19$ $1.52 < (TTL+ImgHT)/PL < 2.32.$

In the above conditional expression, f1 is a focal length of the first lens, f2 is a focal length of the second lens, f3 is a focal length of the third lens, f4 is a focal length of the fourth lens, f5 is a focal length of the fifth lens, R1 is a radius of curvature of an object-side surface of the first lens, and R10 is a radius of curvature of an image-side surface of the fifth lens.

The imaging lens systems according to a first aspect to an eighth aspect may include one or more lenses having the following characteristics, if necessary. For example, the imaging lens system according to a first aspect may include one of the first to fifth lenses having the following characteristics. For another example, the imaging lens system according to a second aspect may include two or more of the first to fifth lenses having the following characteristics.

However, the imaging lens system according to the above-described aspect may not necessarily include the lens having the following characteristics.

The first lens may have refractive power. For example, the first lens may have positive refractive power. The first lens may have one convex surface. For example, the first lens may have a convex object-side surface. The first lens may have a predetermined refractive index. For example, a refractive index of the first lens may be 1.5 or more. As a specific example, the refractive index of the first lens may be greater than 1.5 and less than 1.6. The first lens may have a predetermined Abbe number. For example, the Abbe number of the first lens may be 50 or more. As a specific example, the Abbe number of the first lens may be greater than 52 and less than 62. The first lens may have a predetermined focal length. For example, the focal length of the first lens may be determined in a range of 7.0 mm to 14.0 mm.

The second lens may have refractive power. For example, the second lens may have a positive or negative refractive power. The second lens may have one concave surface. For example, an object-side surface of the second lens may have a concave shape. The second lens may have a predetermined refractive index. For example, the refractive index of the second lens may be 1.6 or more. As a specific example, the refractive index of the second lens may be greater than 1.6 and less than 1.7. The second lens may have a predetermined Abbe number. For example, the Abbe number of the second lens may be 20 or more. As a specific example, the Abbe number of the second lens may be greater than 20 and less than 30. The second lens may have a predetermined focal length. For example, the focal length of the second lens may be determined in a range of −16.0 mm to −8.0 mm. For another example, the focal length of the second lens may be greater than 130 mm.

The third lens may have refractive power. For example, the third lens may have positive refractive power. The third lens may have one convex surface. For example, the third lens may have a convex object-side surface. The third lens may have a predetermined refractive index. For example, the refractive index of the third lens may be 1.6 or more. As a specific example, the refractive index of the third lens may be greater than 1.64 and less than 1.70. The third lens may have a predetermined Abbe number. For example, the Abbe number of the third lens may be 18 or more. As a specific example, the Abbe number of the third lens may be greater than 18 and less than 30. The third lens may have a predetermined focal length. For example, the focal length of the third lens may be determined in a range of 10 mm to 20 mm. For another example, the focal length of the third lens may be 40 mm or more.

The fourth lens may have refractive power. For example, the fourth lens may have a positive or negative refractive power. The fourth lens may have one convex surface. For example, the fourth lens may have a convex image-side surface. The fourth lens may have a predetermined refractive index. For example, the refractive index of the fourth lens may be 1.5 or more. As a specific example, the refractive index of the fourth lens may be greater than 1.5 and less than 1.6. The fourth lens may have a predetermined Abbe number. For example, the Abbe number of the fourth lens may be 50 or more. As a specific example, the Abbe number of the fourth lens may be greater than 50 and less than 60. The fourth lens may have a predetermined focal length. For example, the focal length of the fourth lens may be determined in a range of 10 mm to 24 mm. For another example, the focal length of the fourth lens may be determined in a range of −12 mm to −8.0 mm.

The fifth lens may have refractive power. For example, the fifth lens may have negative refractive power. The fifth lens may have one concave surface. For example, the fifth lens may have a concave image-side surface. The fifth lens may have a predetermined refractive index. For example, the refractive index of the fifth lens may be 1.6 or more. As a specific example, the refractive index of the fifth lens may be greater than 1.6 and less than 1.7. The fifth lens may have a predetermined Abbe number. For example, the Abbe number of the fifth lens may be 20 or more. As a specific example, the Abbe number of the fifth lens may be greater than 24 and less than 32. The fifth lens may have a predetermined focal length. For example, the focal length of the fifth lens may be determined in a range of −12.0 mm to −5.0 mm.

Aspherical surfaces of the first to fifth lenses may be represented by the following Equation 1. In Equation 1, c is an inverse of a radius of curvature of the corresponding lens, k is a conic constant, r is a distance from an arbitrary point on an aspherical surface of the lens to the optical axis, A to H and J indicate aspherical constants, and Z (or SAG) is a height in the optical axis direction from the arbitrary point on the aspheric surface to an apex of the aspheric surface.

$$Z = \frac{cr^2}{1 + \sqrt{1 - (1+k)c^2 r^2}} + Ar^4 + Br^6 + Cr^8 + Dr^{10} + Er^{12} + Fr^{14} + Gr^{16} + Hr^{18} + Jr^{20} \ldots \quad \text{Equation 1}$$

An electronic device according to a first aspect of the present disclosure may be thinned to be easily carried or stored. For example, the electronic device according to an aspect may be a smartphone, a laptop computer, or the like. The electronic device according to an aspect may include a camera module having a long focal length while capable of implementing a high resolution. For example, the electronic device may be equipped with a camera module including one of the imaging lens systems according to a first aspect to an eighth aspect described above. However, the imaging lens system included in the camera module may not be limited to the imaging lens systems according to a first aspect to an eighth aspect, described above.

Hereinafter, example embodiments of the present disclosure will now be described in detail with reference to the accompanying drawings.

First, the present disclosure describes an imaging lens system according to a first example embodiment with reference to FIG. 1.

An imaging lens system 100 according to this example embodiment may include a lens group LG and a prism P, which is one type of the optical path folding member. However, components of the imaging lens system 100 are not limited to the above-mentioned members. For example, the imaging lens system 100 may further include a filter IF and an imaging plane IP. The lens group LG and the prism P may be sequentially disposed from the object side. For example, the lens group LG may be disposed on an object side of the prism P, and the prism P may be disposed between the lens group LG and the imaging plane IP.

Next, examples of the above-mentioned components are described.

The lens group LG may include a plurality of lenses. For example, the lens group LG may include a first lens 110, a second lens 120, a third lens 130, a fourth lens 140, and a fifth lens 150 sequentially arranged from the object side. The first lens 110 to the fifth lens 150 may be arranged at predetermined intervals. For example, an image-side surface of the first lens 110 may not be in contact with an object-side surface of the second lens 120, and an image-side surface of the second lens 120 may not be in contact with an object-side surface of the third lens 130. However, the first lens 110 to the fifth lens 150 may not necessarily be arranged to not be in contact with each other. For example, the image-side surface of the first lens 110 may be in contact with the object-side surface of the second lens 120, and the image-side surface of the second lens 120 may be in contact with the object-side surface of the third lens 130.

Next, characteristics of the first lens 110 to the fifth lens 150 are described according to one or more example embodiments of the present disclosure.

The first lens 110 may have positive refractive power. The first lens 110 may have a convex object-side surface and a concave image-side surface. The second lens 120 may have negative refractive power. The second lens 120 may have a concave object-side surface and a concave image-side surface. The third lens 130 may have positive refractive power. The third lens 130 may have a convex object-side surface and a convex image-side surface. The fourth lens 140 may have positive refractive power. The fourth lens 140 may have a convex object-side surface and a convex image-side surface. The fifth lens 150 may have negative refractive power. The fifth lens 150 may have a convex object-side surface and a concave image-side surface.

Next, the present disclosure describes one or more examples of the prism P which may be the optical path folding member. For reference, the prism described below is an example of one type of the optical path folding member as described herein, and may be changed to another type of the optical path folding member.

The prism P may include a plurality of surfaces. For example, the prism P may include a first surface PS1, a second surface PS2, a third surface PS3, and a fourth surface PS4. The first to fourth surfaces PS1 to PS4 may be sequentially connected to one another to form one facet.

The prism P may include one incident surface, four reflective surfaces, and one exit surface. For example, the first surface PS1 of the prism P may be the incident surface as well as the second reflective surface, the second surface PS2 of the prism P may be the first reflective surface, the third surface PS3 of the prism P may be the third reflective surface as well as the exit surface, and the fourth surface PS4 of the prism P may be the fourth reflective surface.

The first surface PS1 of the prism P may receive light emitted from the lens group LG. For example, a partial region of the first surface PS1 of the prism P may face the rearmost lens in the lens group LG. The first surface PS1 of the prism P may reflect light. For example, a partial region of the first surface PS1 of the prism P may reflect light reflected from the second surface PS2.

The second surface PS2 of the prism P may reflect light incident through the first surface PS1. For example, the second surface PS2 of the prism P may reflect light incident through a partial region of the first surface PS1 to another region of the first surface PS1.

The third surface PS3 of the prism P may reflect as well as emit light. For example, a partial region of the third surface PS3 of the prism P may reflect light reflected from the first surface PS1 to the fourth surface PS4, and another region of the third surface PS3 of the prism P may emit light reflected from the fourth surface PS4 to the imaging plane IP.

The fourth surface PS4 of the prism P may reflect light reflected from the third surface PS3. For example, the fourth surface PS4 of the prism P may reflect light reflected from the partial region of the third surface PS3 to another region of the third surface PS3.

The prism P may perform total reflection and regular reflection. For example, the second surface PS2 and the fourth surface PS4 of the prism P may perform the total reflection, and the first surface PS1 and the third surface PS3 of the prism P may perform the regular reflection or mirror reflection. For example, incident angles of the first and third surfaces PS1 and PS3 may be greater than incident angles of the second and fourth surfaces PS2 and PS4. For another example, the incident angles of the first and third surfaces PS1 and PS3 may be greater than critical angles of corresponding surfaces, and the incident angles of the second and fourth surfaces PS2 and PS4 may be smaller than the critical angles of the corresponding surfaces.

The first surface PS1, second surface PS2, third surface PS3, and fourth surface PS4 of the prism P may have predetermined angles. For example, the first surface PS1 and the second surface PS2 may have an acute angle. As a specific example, the angle between the first surface PS1 and the second surface PS2 may be 26 to 34 degrees. For another example, the first surface PS1 and the fourth surface PS4 may have an obtuse angle. As a specific example, the angle between the first surface PS1 and the fourth surface PS4 may be 146 to 154 degrees. For another example, the second surface PS2 and the third surface PS3 may have an obtuse angle. As a specific example, the angle between the second surface PS2 and the third surface PS3 may be 146 to 154 degrees. For another example, the third and fourth surfaces PS3 and PS4 may have an acute angle. As a specific example, the angle between the third and fourth surfaces PS3 and PS4 may be 26 to 34 degrees.

The filter IF and the imaging plane IP may be disposed adjacent to the exit surface of the prism P.

The filter IF may block light of a specific wavelength. For example, the filter IF according to this example embodiment may block infrared light. However, a type of light blocked by the filter IF is not limited to the infrared light. For example, the filter IF may block ultraviolet or visible light.

The imaging plane IP may be disposed at a point at which light reflected from the fourth reflective surface PS4 of the prism P converges or forms an image, and may be formed by an image sensor IS or the like. For example, the imaging plane IP may be formed on or inside the image sensor IS.

Figure 2:
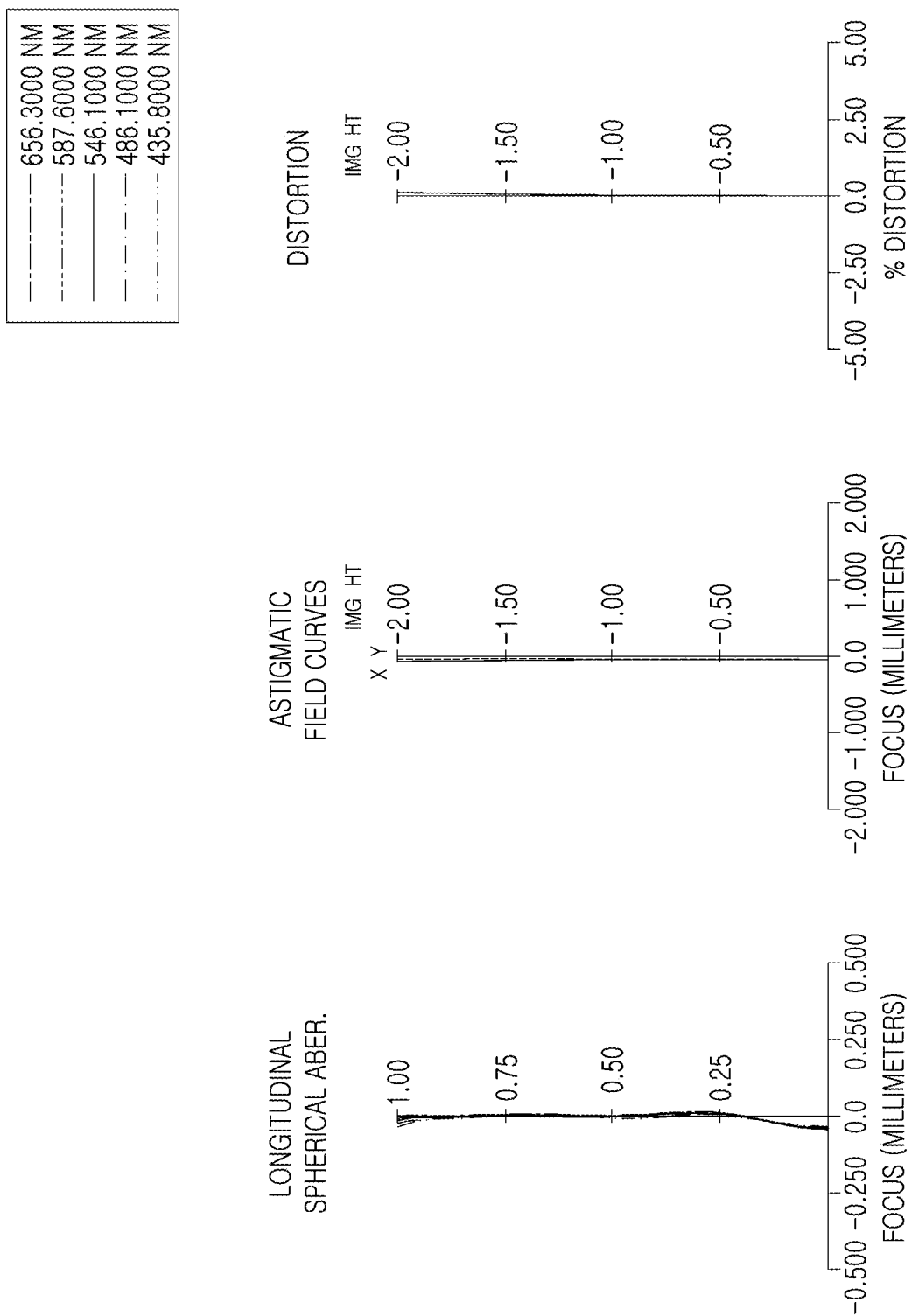
FIG. 2 is an aberration curve of the imaging lens system illustrated in FIG. 1.

The imaging lens system 100 configured as above may illustrate aberration characteristics illustrated in FIG. 2. Tables 1 and 2 each illustrate the lens characteristics and aspherical value of the imaging lens system according to this example embodiment.

TABLE 1

| Surface no. | Component | Radius of curvature | Thickness/ Distance | Refractive index | Abbe number |
|---|---|---|---|---|---|
| S1 | First lens | 3.97648 | 0.812 | 1.537 | 55.7 |
| S2 |  | 162.059 | 0.277 |  |  |
| S3 | Second lens | −32.579 | 0.222 | 1.621 | 26.0 |
| S4 |  | 7.393 | 0.289 |  |  |
| S5 | Third lens | 8.066 | 0.300 | 1.679 | 19.2 |
| S6 |  | −360.182 | 0.100 |  |  |
| S7 | Fourth lens | 10.124 | 0.313 | 1.537 | 55.7 |
| S8 |  | −36.1606 | 0.090 |  |  |
| S9 | Fifth lens | 27.0447 | 0.300 | 1.621 | 26.0 |
| S10 |  | 3.77351 | 0.500 |  |  |

TABLE 1-continued

| Surface no. | Component | Radius of curvature | Thickness/ Distance | Refractive index | Abbe number |
|---|---|---|---|---|---|
| S11 | Prism | Infinity | 1.500 | 1.519 | 64.2 |
| S12 | | Infinity | 3.000 | 1.519 | 64.2 |
| S13 | | Infinity | 5.500 | 1.519 | 64.2 |
| S14 | | Infinity | 3.500 | 1.519 | 64.2 |
| S15 | | Infinity | 0.210 | 1.519 | 64.2 |
| S16 | | Infinity | 0.500 | | |
| S17 | Filter | Infinity | 0.210 | 1.519 | 64.2 |
| S18 | | Infinity | 1.073 | | |
| S19 | Imaging plane | Infinity | 0.041 | | |

TABLE 2

| | Surface no. | | | | | | | | | |
|---|---|---|---|---|---|---|---|---|---|---|
| | S1 | S2 | S3 | S4 | S5 | S6 | S7 | S8 | S9 | S10 |
| K | 0 | 0 | 0 | 0 | 0 | 0 | −1.438E+01 | 0 | 0 | 5.848E−01 |
| A | 0 | 0 | 0 | 0 | 0 | 0 | 1.153E−02 | 0 | 0 | −4.057E−03 |
| B | 0 | 0 | 0 | 0 | 0 | 0 | 2.594E−03 | 0 | 0 | −7.373E−03 |
| C | 0 | 0 | 0 | 0 | 0 | 0 | −1.417E−03 | 0 | 0 | 4.772E−03 |
| D | 0 | 0 | 0 | 0 | 0 | 0 | 0 | 0 | 0 | 2.042E−03 |
| E | 0 | 0 | 0 | 0 | 0 | 0 | 0 | 0 | 0 | 0 |
| F | 0 | 0 | 0 | 0 | 0 | 0 | 0 | 0 | 0 | 0 |
| G | 0 | 0 | 0 | 0 | 0 | 0 | 0 | 0 | 0 | 0 |
| H | 0 | 0 | 0 | 0 | 0 | 0 | 0 | 0 | 0 | 0 |
| J | 0 | 0 | 0 | 0 | 0 | 0 | 0 | 0 | 0 | 0 |

Figure 3:
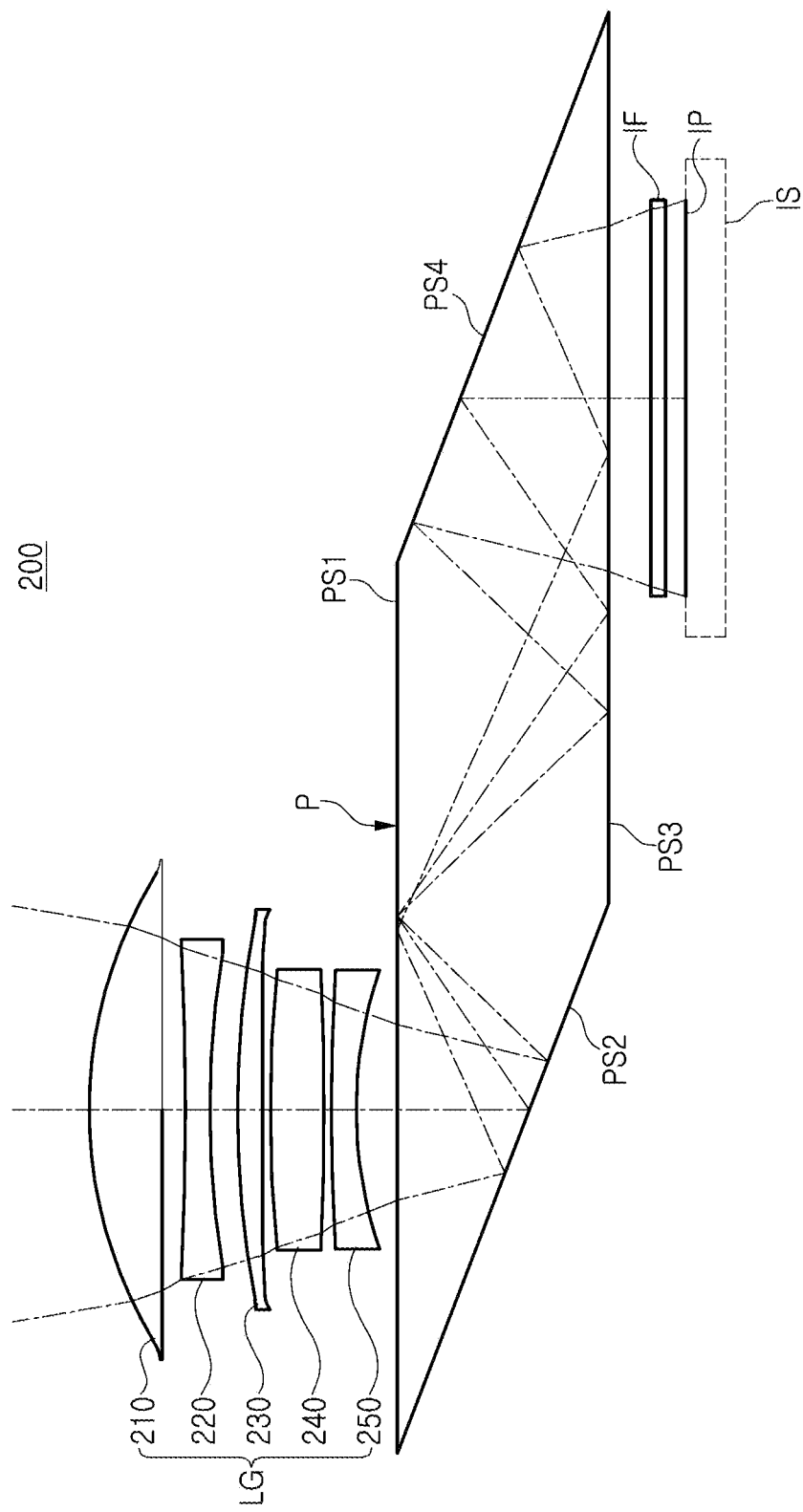
FIG. 3 is a configuration diagram of an imaging lens system according to a second example embodiment.

The present disclosure now describes an imaging lens system according to a second example embodiment with reference to FIG. 3.

An imaging lens system 200 according to this example embodiment may include a lens group LG and a prism P, which is one type of the optical path folding member. However, components of the imaging lens system 200 are not limited to the above-mentioned members. For example, the imaging lens system 200 may further include a filter IF and an imaging plane IP. The lens group LG and the prism P may be sequentially disposed from the object side. For example, the lens group LG may be disposed on an object side of the prism P, and the prism P may be disposed between the lens group LG and the imaging plane IP.

Next, examples of the above-mentioned components are described.

The lens group LG may include a plurality of lenses. For example, the lens group LG may include a first lens 210, a second lens 220, a third lens 230, a fourth lens 240, and a fifth lens 250 sequentially arranged from the object side. The first lens 210 to the fifth lens 250 may be arranged at predetermined intervals. For example, an image-side surface of the first lens 210 may not be in contact with an object-side surface of the second lens 220, and an image-side surface of the second lens 220 may not be in contact with an object-side surface of the third lens 230. However, the first lens 210 to the fifth lens 250 may not necessarily be arranged to not be in contact with each other. For example, the image-side surface of the first lens 210 may be in contact with the object-side surface of the second 220, and the image-side surface of the second lens 220 may be in contact with the object-side surface of the third lens 230.

Next, characteristics of the first lens 210 to the fifth lens 250 are described according to one or more example embodiments of the present disclosure.

The first lens 210 may have positive refractive power. The first lens 210 may have a convex object-side surface and a concave image-side surface. The second lens 220 may have negative refractive power. The second lens 220 may have a concave object-side surface and a concave image-side surface. The third lens 230 may have positive refractive power. The third lens 230 may have a convex object-side surface and a convex image-side surface. The fourth lens 240 may have positive refractive power. The fourth lens 240 may have a convex object-side surface and a convex image-side surface. The fifth lens 250 may have negative refractive power. The fifth lens 250 may have a convex object-side surface and a concave image-side surface.

Next, the present disclosure describes one or more examples of the prism P which may be the optical path folding member. For reference, the prism described below is an example of one type of the optical path folding member as described herein, and may be changed to another type of the optical path folding member.

The prism P may include a plurality of surfaces. For example, the prism P may include a first surface PS1, a second surface PS2, a third surface PS3, and a fourth surface PS4. The first to fourth surfaces PS1 to PS4 may be sequentially connected to one another to form one facet.

The prism P may include one incident surface, four reflective surfaces, and one exit surface. For example, the first surface PS1 of the prism P may be the incident surface as well as the second reflective surface, the second surface PS2 of the prism P may be the first reflective surface, the third surface PS3 of the prism P may be the third reflective surface as well as the exit surface, and the fourth surface PS4 of the prism P may be the fourth reflective surface.

The first surface PS1 of the prism P may receive light emitted from the lens group LG. For example, a partial region of the first surface PS1 of the prism P may face the rearmost lens in the lens group LG. The first surface PS1 of the prism P may reflect light. For example, a partial region of the first surface PS1 of the prism P may reflect light reflected from the second surface PS2.

The second surface PS2 of the prism P may reflect light incident through the first surface PS1. For example, the second surface PS2 of the prism P may reflect light incident through a partial region of the first surface PS1 to another region of the first surface PS1.

The third surface PS3 of the prism P may reflect as well as emit light. For example, a partial region of the third surface PS3 of the prism P may reflect light reflected from the first surface PS1 to the fourth surface PS4, and another region of the third surface PS3 of the prism P may emit light reflected from the fourth surface PS4 to the imaging plane IP.

The fourth surface PS4 of the prism P may reflect light reflected from the third surface PS3. For example, the fourth surface PS4 of the prism P may reflect light reflected from the partial region of the third surface PS3 to another region of the third surface PS3.

The prism P may perform total reflection and regular reflection. For example, the second surface PS2 and the fourth surface PS4 of the prism P may perform the total reflection, and the first surface PS1 and the third surface PS3 of the prism P may perform the regular reflection or mirror reflection. For example, incident angles of the first and third surfaces PS1 and PS3 may be greater than incident angles of the second and fourth surfaces PS2 and PS4. For another example, the incident angles of the first and third surfaces PS1 and PS3 may be greater than critical angles of corresponding surfaces, and the incident angles of the second and fourth surfaces PS2 and PS4 may be smaller than the critical angles of the corresponding surfaces.

The first surface PS1, second surface PS2, third surface PS3, and fourth surface PS4 of the prism P may form predetermined angles. For example, the first surface PS1 and the second surface PS2 may have an acute angle. As a specific example, the angle between the first surface PS1 and the second surface PS2 may be 26 to 34 degrees. For another example, the first surface PS1 and the fourth surface PS4 may have an obtuse angle. As a specific example, the angle between the first surface PS1 and the fourth surface PS4 may be 146 to 154 degrees. For another example, the second surface PS2 and the third surface PS3 may have an obtuse angle. As a specific example, the angle between the second surface PS2 and the third surface PS3 may be 146 to 154 degrees. For another example, the third and fourth surfaces PS3 and PS4 may have an acute angle. As a specific example, the angle between the third and fourth surfaces PS3 and PS4 may be 26 to 34 degrees.

The filter IF and the imaging plane IP may be disposed adjacent to the exit surface of the prism P.

The filter IF may block light of a specific wavelength. For example, the filter IF according to this example embodiment may block infrared light. However, a type of light blocked by the filter IF is not limited to the infrared light. For example, the filter IF may block ultraviolet or visible light.

The imaging plane IP may be disposed at a point at which light reflected from the fourth reflective surface PS4 of the prism P converges or forms an image, and may be formed by an image sensor IS or the like. For example, the imaging plane IP may be formed on or inside the image sensor IS.

Figure 4:
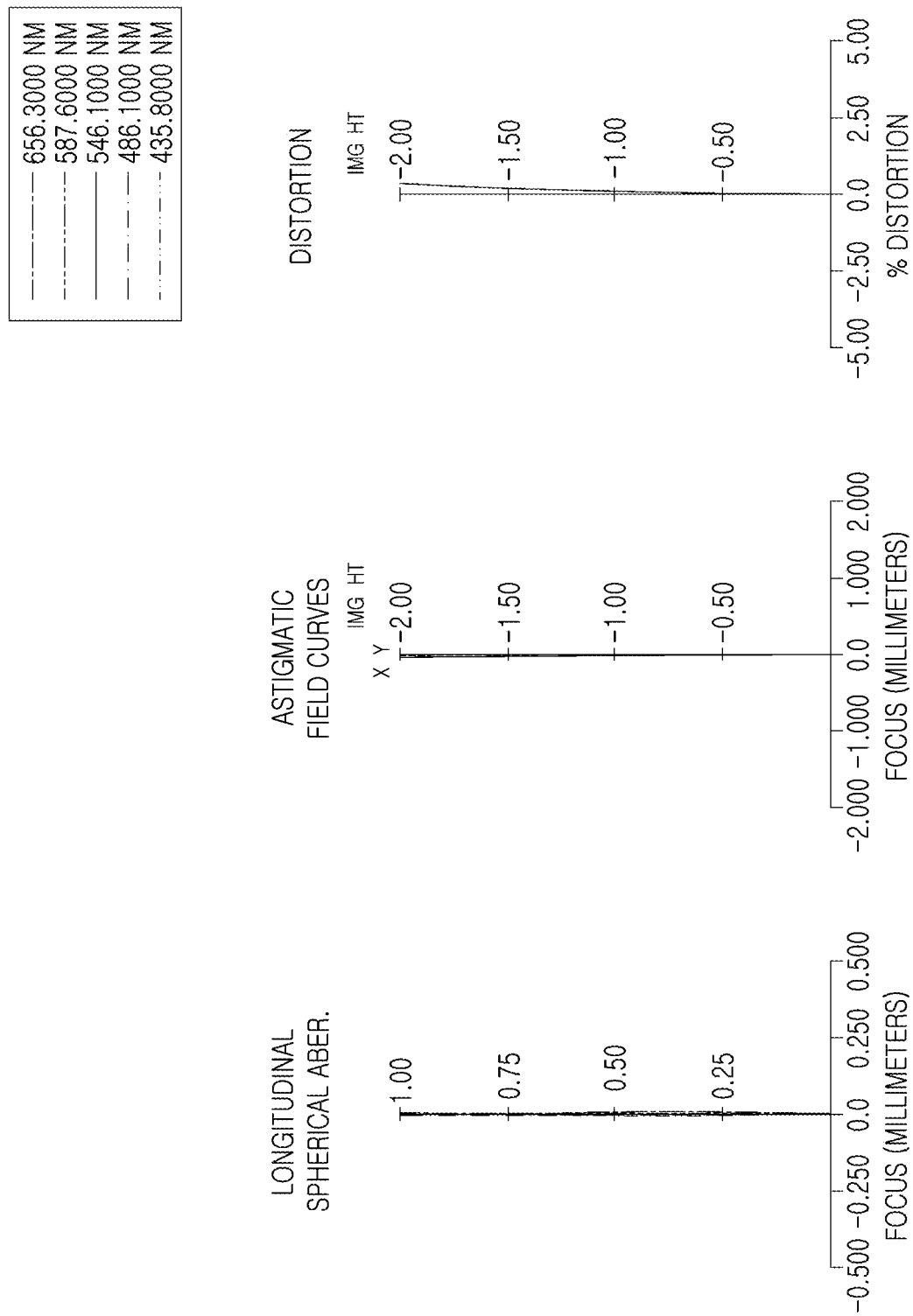
FIG. 4 is an aberration curve of the imaging lens system illustrated in FIG. 3.

The imaging lens system 200 configured as above may illustrate aberration characteristics illustrated in FIG. 4. Tables 3 and 4 each illustrate the lens characteristics and aspherical value of the imaging lens system according to this example embodiment.

TABLE 3

| Surface no. | Component | Radius of curvature | Thickness/ Distance | Refractive index | Abbe number |
|---|---|---|---|---|---|
| S1 | First lens | 3.94238 | 0.875 | 1.537 | 55.7 |
| S2 | | 349.800 | 0.292 | | |
| S3 | Second lens | −24.564 | 0.298 | 1.621 | 26.0 |
| S4 | | 8.285 | 0.335 | | |
| S5 | Third lens | 8.727 | 0.300 | 1.679 | 19.2 |
| S6 | | −386.721 | 0.100 | | |
| S7 | Fourth lens | 10.037 | 0.654 | 1.537 | 55.7 |
| S8 | | −20.5465 | 0.090 | | |
| S9 | Fifth lens | 28.5194 | 0.300 | 1.621 | 26.0 |
| S10 | | 3.51177 | 0.500 | | |
| S11 | Prism | Infinity | 1.600 | 1.519 | 64.2 |
| S12 | | Infinity | 2.500 | 1.519 | 64.2 |
| S13 | | Infinity | 4.000 | 1.519 | 64.2 |
| S14 | | Infinity | 2.800 | 1.519 | 64.2 |
| S15 | | Infinity | 0.334 | 1.519 | 64.2 |
| S16 | | Infinity | 0.500 | | |
| S17 | Filter | Infinity | 0.210 | 1.519 | 64.2 |
| S18 | | Infinity | 1.188 | | |
| S19 | Imaging plane | Infinity | 0.001 | | |

TABLE 4

| | Surface no. | | | | | | | | | |
|---|---|---|---|---|---|---|---|---|---|---|
| | S1 | S2 | S3 | S4 | S5 | S6 | S7 | S8 | S9 | S10 |
| K | 0 | 0 | 0 | 0 | 0 | 0 | −1.420E+01 | 0 | 0 | 5.697E−01 |
| A | 0 | 0 | 0 | 0 | 0 | 0 | 1.104E−02 | 0 | 0 | −4.340E−03 |
| B | 0 | 0 | 0 | 0 | 0 | 0 | 2.123E−03 | 0 | 0 | −7.661E−03 |
| C | 0 | 0 | 0 | 0 | 0 | 0 | −1.363E−03 | 0 | 0 | 4.859E−03 |
| D | 0 | 0 | 0 | 0 | 0 | 0 | 2.927E−04 | 0 | 0 | 1.924E−03 |
| E | 0 | 0 | 0 | 0 | 0 | 0 | 0 | 0 | 0 | 0 |
| F | 0 | 0 | 0 | 0 | 0 | 0 | 0 | 0 | 0 | 0 |
| G | 0 | 0 | 0 | 0 | 0 | 0 | 0 | 0 | 0 | 0 |
| H | 0 | 0 | 0 | 0 | 0 | 0 | 0 | 0 | 0 | 0 |
| J | 0 | 0 | 0 | 0 | 0 | 0 | 0 | 0 | 0 | 0 |

Figure 5:
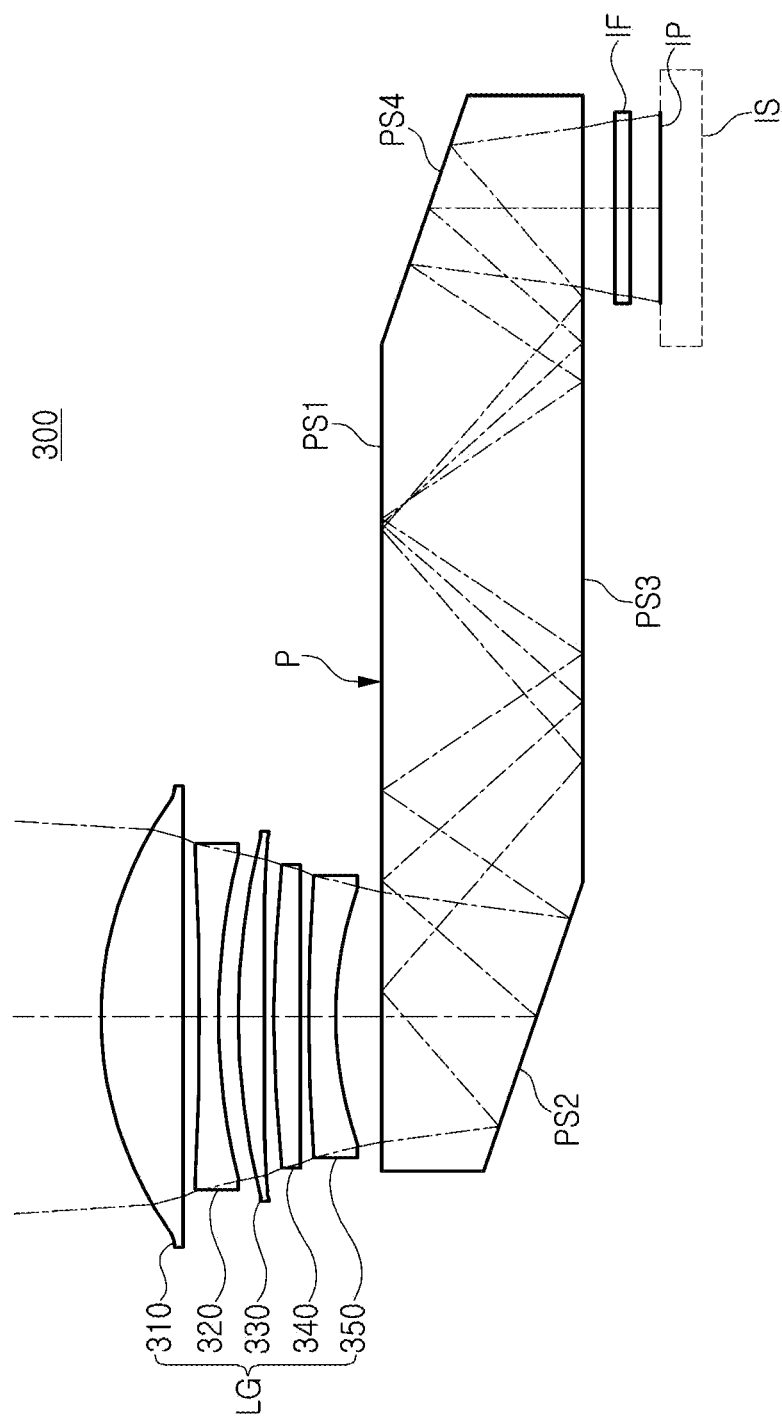
FIG. 5 is a configuration diagram of an imaging lens system according to a third example embodiment.

The present disclosure now describes an imaging lens system according to a third example embodiment with reference to FIG. 5.

An imaging lens system 300 according to this example embodiment may include a lens group LG and a prism P, which is one type of the optical path folding member. However, components of the imaging lens system 300 are not limited to the above-mentioned members. For example, the imaging lens system 300 may further include a filter IF and an imaging plane IP. The lens group LG and the prism P may be sequentially disposed from the object side. For example, the lens group LG may be disposed on an object side of the prism P, and the prism P may be disposed between the lens group LG and the imaging plane IP.

Next, examples of the above-mentioned components are described.

The lens group LG may include a plurality of lenses. For example, the lens group LG may include a first lens 310, a second lens 320, a third lens 330, a fourth lens 340, and a fifth lens 350 sequentially arranged from the object side. The first lens 310 to the fifth lens 350 may be arranged at predetermined intervals. For example, an image-side surface of the first lens 310 may not be in contact with an object-side surface of the second lens 320, and an image-side surface of the second lens 320 may not be in contact with an object-side surface of the third lens 330. However, the first lens 310 to the fifth lens 350 may not necessarily be arranged to not be in contact with each other. For example, the image-side surface of the first lens 310 may be in contact with the object-side surface of the second lens 320, and the image-side surface of the second lens 320 may be in contact with the object-side surface of the third lens 330.

Next, characteristics of the first lens 310 to the fifth lens 350 are described according to one or more example embodiments of the present disclosure.

The first lens 310 may have positive refractive power. The first lens 310 may have a convex object-side surface and a concave image-side surface. The second lens 320 may have negative refractive power. The second lens 320 may have a concave object-side surface and a concave image-side surface. The third lens 330 may have positive refractive power. The third lens 330 may have a convex object-side surface and a convex image-side surface. The fourth lens 340 may have positive refractive power. The fourth lens 340 may have a convex object-side surface and a convex image-side surface. The fifth lens 350 may have negative refractive power. The fifth lens 350 may have a convex object-side surface and a concave image-side surface.

Next, the present disclosure describes one or more examples of the prism P which may be the optical path folding member. For reference, the prism described below is an example of one type of the optical path folding member as described herein, and may be changed to another type of the optical path folding member.

The prism P may include a plurality of surfaces. For example, the prism P may include a first surface PS1, a second surface PS2, a third surface PS3, and a fourth surface PS4. The first to fourth surfaces PS1 to PS4 may be sequentially connected to one another to form one facet.

The prism P may include one incident surface, six reflective surfaces, and one exit surface. For example, the first surface PS1 of the prism P may be the incident surface and may be the second reflective surface as well as the fourth reflective surface, the second surface PS2 of the prism P may be the first reflective surface, the third surface PS3 of the prism P may be the third reflective surface and may be the fifth reflective surface as well as the exit surface, and the fourth surface PS4 of the prism P may be the sixth reflective surface.

The first surface PS1 of the prism P may receive light emitted from the lens group LG. For example, a partial region of the first surface PS1 of the prism P may face the rearmost lens in the lens group LG. The first surface PS1 of the prism P may reflect light. For example, a partial region of the first surface PS1 of the prism P may reflect light reflected from the second surface PS2. In addition, another region of the first surface PS1 of prism P may reflect light reflected from the third surface PS3.

The second surface PS2 of the prism P may reflect light incident through the first surface PS1. For example, the second surface PS2 of the prism P may reflect light incident through a partial region of the first surface PS1 to another region of the first surface PS1.

The third surface PS3 of the prism P may reflect as well as emit light. For example, a partial region of the third surface PS3 of the prism P may reflect light reflected from the first surface PS1 to the fourth surface PS4, and another region of the third surface PS3 of the prism P may emit light reflected from the fourth surface PS4 to the imaging plane IP.

The fourth surface PS4 of the prism P may reflect light reflected from the third surface PS3. For example, the fourth surface PS4 of the prism P may reflect light reflected from the partial region of the third surface PS3 to another region of the third surface PS3.

The prism P may perform total reflection and regular reflection. For example, the second surface PS2 and the fourth surface PS4 of the prism P may perform the total reflection, and the first surface PS1 and the third surface PS3 of the prism P may perform the regular reflection or mirror reflection. For example, incident angles of the first and third surfaces PS1 and PS3 may be greater than incident angles of the second and fourth surfaces PS2 and PS4. For another example, the incident angles of the first and third surfaces PS1 and PS3 may be greater than critical angles of corresponding surfaces, and the incident angles of the second and fourth surfaces PS2 and PS4 may be smaller than the critical angles of the corresponding surfaces.

The first surface PS1, second surface PS2, third surface PS3, and fourth surface PS4 of the prism P may form predetermined angles. For example, the first surface PS1 and the second surface PS2 may have an acute angle. As a specific example, the angle between the first surface PS1 and the second surface PS2 may be 26 to 34 degrees. For another example, the first surface PS1 and the fourth surface PS4 may have an obtuse angle. As a specific example, the angle between the first surface PS1 and the fourth surface PS4 may be 146 to 154 degrees. For another example, the second surface PS2 and the third surface PS3 may have an obtuse angle. As a specific example, the angle between the second surface PS2 and the third surface PS3 may be 146 to 154 degrees. For another example, the third and fourth surfaces PS3 and PS4 may have an acute angle. As a specific example, the angle between the third and fourth surfaces PS3 and PS4 may be 26 to 34 degrees.

The filter IF and the imaging plane IP may be disposed adjacent to the exit surface of the prism P.

The filter IF may block light of a specific wavelength. For example, the filter IF according to this example embodiment may block infrared light. However, a type of light blocked by the filter IF is not limited to the infrared light. For example, the filter IF may block ultraviolet or visible light.

The imaging plane IP may be disposed at a point at which light reflected from the fourth reflective surface PS4 of the prism P converges or forms an image, and may be formed by an image sensor IS or the like. For example, the imaging plane IP may be formed on or inside an image sensor IS.

Figure 6:
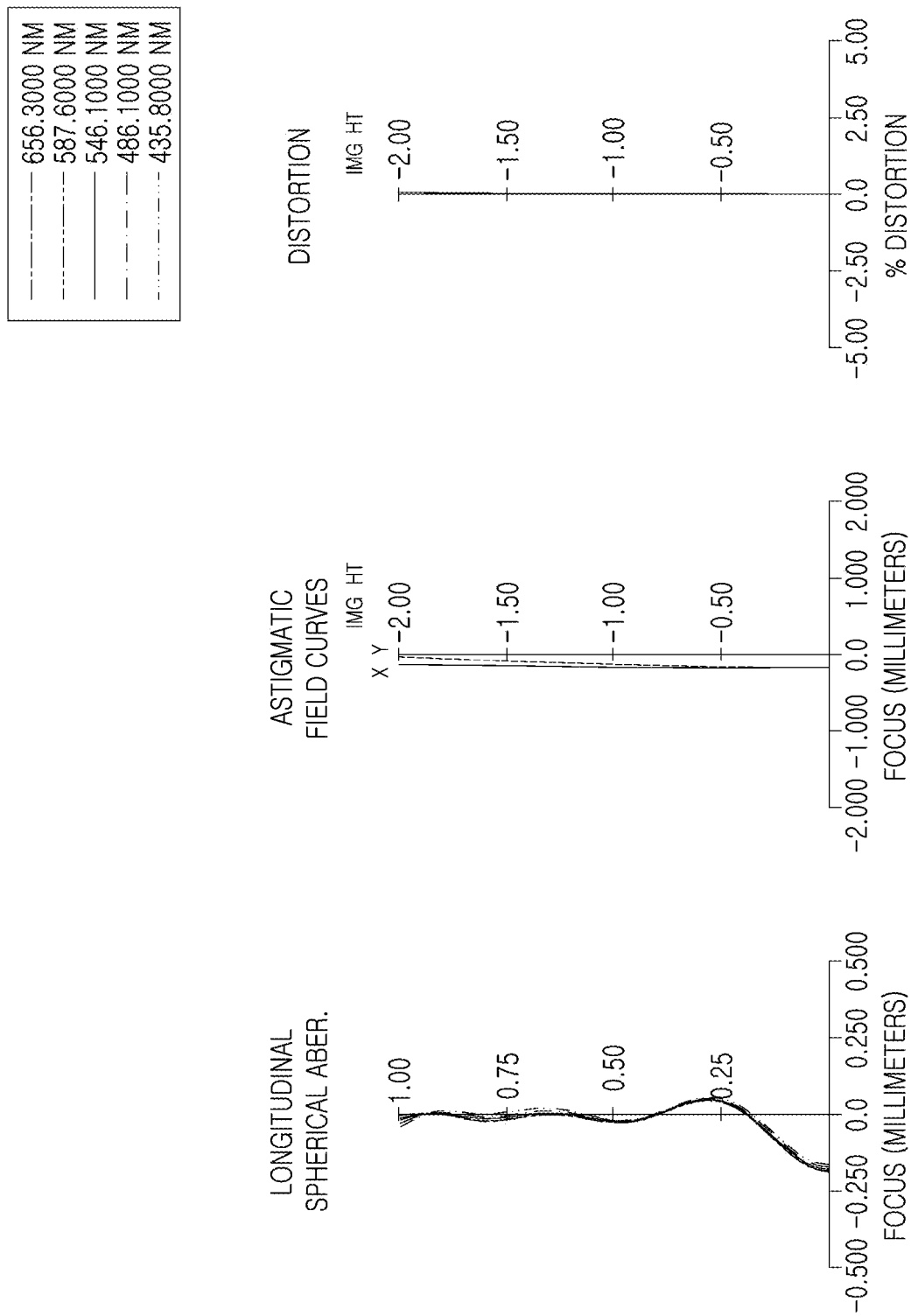
FIG. 6 is an aberration curve of the imaging lens system illustrated in FIG. 5.

The imaging lens system 300 configured as above may illustrate aberration characteristics illustrated in FIG. 6. Tables 5 and 6 each illustrate the lens characteristics and aspherical value of the imaging lens system according to this example embodiment.

TABLE 5

| Surface no. | Component | Radius of curvature | Thickness/ Distance | Refractive index | Abbe number |
|---|---|---|---|---|---|
| S1 | First lens | 3.99514 | 0.932 | 1.537 | 55.7 |
| S2 | | 435.155 | 0.182 | | |
| S3 | Second lens | −34.370 | 0.220 | 1.621 | 26.0 |
| S4 | | 6.889 | 0.230 | | |
| S5 | Third lens | 7.839 | 0.300 | 1.679 | 19.2 |
| S6 | | −285.403 | 0.100 | | |
| S7 | Fourth lens | 10.311 | 0.310 | 1.537 | 55.7 |
| S8 | | −106.374 | 0.090 | | |
| S9 | Fifth lens | 19.4246 | 0.300 | 1.621 | 26.0 |
| S10 | | 3.68013 | 0.500 | | |
| S11 | Prism | Infinity | 1.800 | 1.519 | 64.2 |
| S12 | | Infinity | 2.300 | 1.519 | 64.2 |
| S13 | | Infinity | 3.000 | 1.519 | 64.2 |
| S14 | | Infinity | 3.000 | 1.519 | 64.2 |
| S15 | | Infinity | 1.888 | 1.519 | 64.2 |
| S16 | | Infinity | 2.300 | 1.519 | 64.2 |
| S17 | | Infinity | 1.800 | 1.519 | 64.2 |
| S18 | | Infinity | 0.300 | | |
| S19 | Filter | Infinity | 0.210 | 1.519 | 64.2 |
| S20 | | Infinity | 0.885 | | |
| S21 | Imaging plane | Infinity | 0.181 | | |

TABLE 6

| | Surface no. | | | | | | | | | |
|---|---|---|---|---|---|---|---|---|---|---|
| | S1 | S2 | S3 | S4 | S5 | S6 | S7 | S8 | S9 | S10 |
| K | 0 | 0 | 0 | 0 | 0 | 0 | −1.414E+01 | 0 | 0 | 5.805E−01 |
| A | 0 | 0 | 0 | 0 | 0 | 0 | 1.255E−02 | 0 | 0 | −4.177E−03 |
| B | 0 | 0 | 0 | 0 | 0 | 0 | 2.459E−03 | 0 | 0 | −7.802E−03 |
| C | 0 | 0 | 0 | 0 | 0 | 0 | −9.462E−04 | 0 | 0 | 4.997E−03 |
| D | 0 | 0 | 0 | 0 | 0 | 0 | −2.844E−04 | 0 | 0 | 1.960E−03 |

TABLE 6-continued

| | Surface no. | | | | | | | | | |
|---|---|---|---|---|---|---|---|---|---|---|
| | S1 | S2 | S3 | S4 | S5 | S6 | S7 | S8 | S9 | S10 |
| E | 0 | 0 | 0 | 0 | 0 | 0 | 0 | 0 | 0 | 0 |
| F | 0 | 0 | 0 | 0 | 0 | 0 | 0 | 0 | 0 | 0 |
| G | 0 | 0 | 0 | 0 | 0 | 0 | 0 | 0 | 0 | 0 |
| H | 0 | 0 | 0 | 0 | 0 | 0 | 0 | 0 | 0 | 0 |
| J | 0 | 0 | 0 | 0 | 0 | 0 | 0 | 0 | 0 | 0 |

Figure 7:
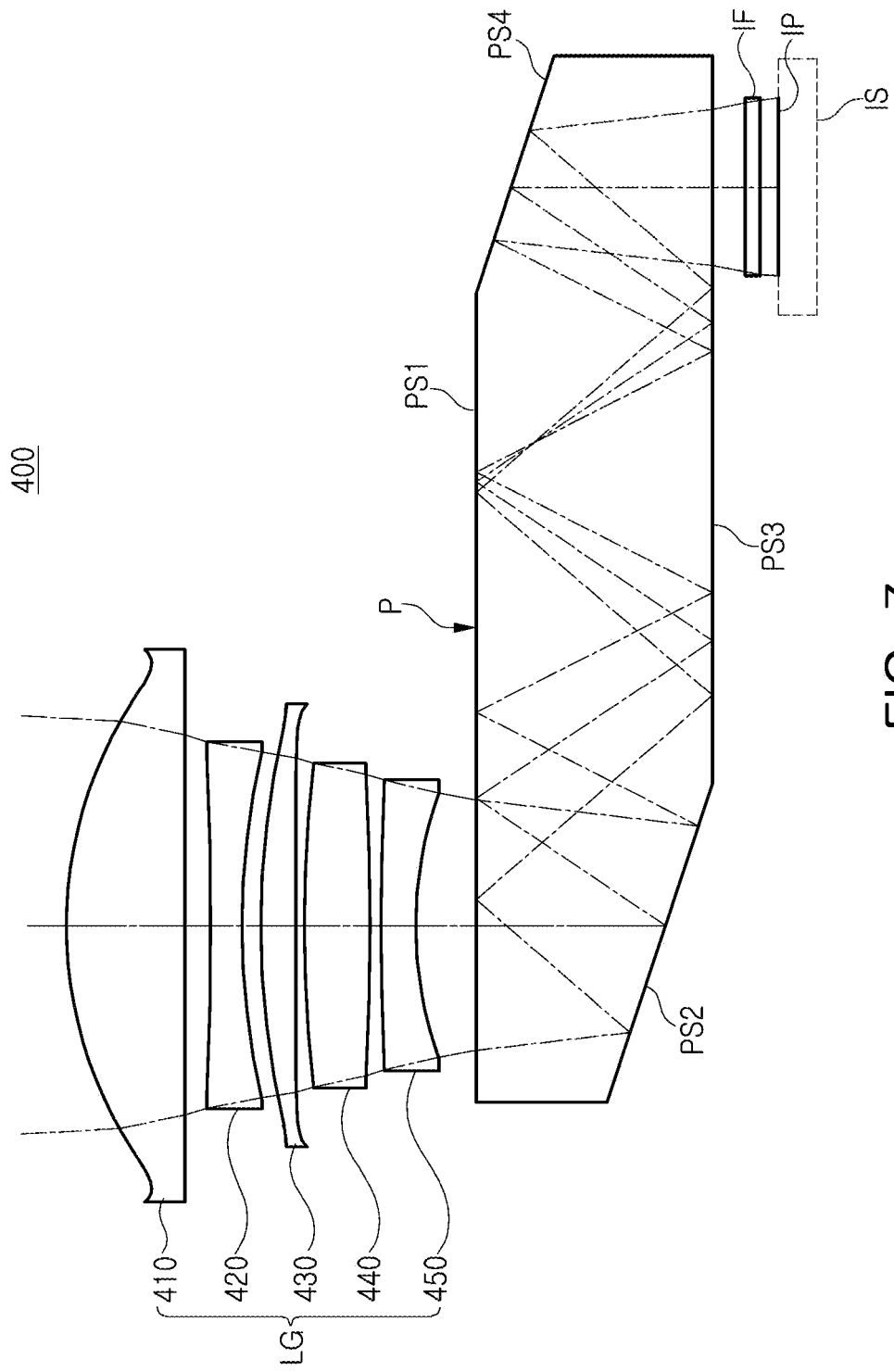
FIG. 7 is a configuration diagram of an imaging lens system according to a fourth example embodiment.

The present disclosure now describes an imaging lens system according to a fourth example embodiment with reference to FIG. 7.

An imaging lens system 400 according to this example embodiment may include a lens group LG and a prism P, which is one type of the optical path folding member. However, components of the imaging lens system 400 are not limited to the above-mentioned members. For example, the imaging lens system 400 may further include a filter IF and an imaging plane IP. The lens group LG and the prism P may be sequentially disposed from the object side. For example, the lens group LG may be disposed on an object side of the prism P, and the prism P may be disposed between the lens group LG and the imaging plane IP.

Next, examples of the above-mentioned components are described.

The lens group LG may include a plurality of lenses. For example, the lens group LG may include a first lens 410, a second lens 420, a third lens 430, a fourth lens 440, and a fifth lens 450 sequentially arranged from the object side. The first lens 410 to the fifth lens 450 may be arranged at predetermined intervals. For example, an image-side surface of the first lens 410 may not be in contact with an object-side surface of the second lens 420, and an image-side surface of the second lens 420 may not be in contact with an object-side surface of the third lens 430. However, the first lens 410 to the fifth lens 450 may not necessarily be arranged to not be in contact with each other. For example, the image-side surface of the first lens 410 may be in contact with the object-side surface of the second lens 420, and the image-side surface of the second lens 420 may be in contact with the object-side surface of the third lens 430.

Next, characteristics of the first lens 410 to the fifth lens 450 are described according to one or more example embodiments of the present disclosure.

The first lens 410 may have positive refractive power. The first lens 410 may have a convex object-side surface and a concave image-side surface. The second lens 420 may have negative refractive power. The second lens 420 may have a concave object-side surface and a concave image-side surface. The third lens 430 may have positive refractive power. The third lens 430 may have a convex object-side surface and a convex image-side surface. The fourth lens 440 may have positive refractive power. The fourth lens 440 may have a convex object-side surface and a convex image-side surface. The fifth lens 450 may have negative refractive power. The fifth lens 450 may have a convex object-side surface and a concave image-side surface.

Next, the present disclosure describes one or more examples of the prism P which may be the optical path folding member. For reference, the prism described below is an example of one type of the optical path folding member as described herein, and may be changed to another type of the optical path folding member.

The prism P may include a plurality of surfaces. For example, the prism P may include a first surface PS1, a second surface PS2, a third surface PS3, and a fourth surface PS4. The first to fourth surfaces PS1 to PS4 may be sequentially connected to one another to form one facet.

The prism P may include one incident surface, six reflective surfaces, and one exit surface. For example, the first surface PS1 of the prism P may be the incident surface and may be the second reflective surface as well as the fourth reflective surface, the second surface PS2 of the prism P may be the first reflective surface, the third surface PS3 of the prism P may be the third reflective surface and may be the fifth reflective surface as well as the exit surface, and the fourth surface PS4 of the prism P may be the sixth reflective surface.

The first surface PS1 of the prism P may receive light emitted from the lens group LG. For example, a partial region of the first surface PS1 of the prism P may face the rearmost lens in the lens group LG. The first surface PS1 of the prism P may reflect light. For example, a partial region of the first surface PS1 of the prism P may reflect light reflected from the second surface PS2. In addition, another region of the first surface PS1 of prism P may reflect light reflected from the third surface PS3.

The second surface PS2 of the prism P may reflect light incident through the first surface PS1. For example, the second surface PS2 of the prism P may reflect light incident through a partial region of the first surface PS1 to another region of the first surface PS1.

The third surface PS3 of the prism P may reflect as well as emit light. For example, a partial region of the third surface PS3 of the prism P may reflect light reflected from the first surface PS1 to the fourth surface PS4, and another region of the third surface PS3 of the prism P may emit light reflected from the fourth surface PS4 to the imaging plane IP.

The fourth surface PS4 of the prism P may reflect light reflected from the third surface PS3. For example, the fourth surface PS4 of the prism P may reflect light reflected from the partial region of the third surface PS3 to another region of the third surface PS3.

The prism P may perform total reflection and regular reflection. For example, the second surface PS2 and the fourth surface PS4 of the prism P may perform the total reflection, and the first surface PS1 and the third surface PS3 of the prism P may perform the regular reflection or mirror reflection. For example, incident angles of the first and third surfaces PS1 and PS3 may be greater than incident angles of the second and fourth surfaces PS2 and PS4. For another example, the incident angles of the first and third surfaces PS1 and PS3 may be greater than critical angles of corresponding surfaces, and the incident angles of the second and fourth surfaces PS2 and PS4 may be smaller than the critical angles of the corresponding surfaces.

The first surface PS1, second surface PS2, third surface PS3, and fourth surface PS4 of the prism P may form predetermined angles. For example, the first surface PS1 and the second surface PS2 may have an acute angle. As a specific example, the angle between the first surface PS1 and the second surface PS2 may be 26 to 34 degrees. For another example, the first surface PS1 and the fourth surface PS4 may have an obtuse angle. As a specific example, the angle between the first surface PS1 and the fourth surface PS4 may be 146 to 154 degrees. For another example, the second surface PS2 and the third surface PS3 may have an obtuse angle. As a specific example, the angle between the second surface PS2 and the third surface PS3 may be 146 to 154 degrees. For another example, the third and fourth surfaces PS3 and PS4 may have an acute angle. As a specific example, the angle between the third and fourth surfaces PS3 and PS4 may be 26 to 34 degrees.

The filter IF and the imaging plane IP may be disposed adjacent to the exit surface of the prism P.

The filter IF may block light of a specific wavelength. For example, the filter IF according to this example embodiment may block infrared light. However, a type of light blocked by the filter IF is not limited to the infrared light. For example, the filter IF may block ultraviolet or visible light.

The imaging plane IP may be disposed at a point at which light reflected from the fourth reflective surface PS4 of the prism P converges or forms an image, and may be formed by an image sensor IS or the like. For example, the imaging plane IP may be formed on or inside an image sensor IS.

Figure 8:
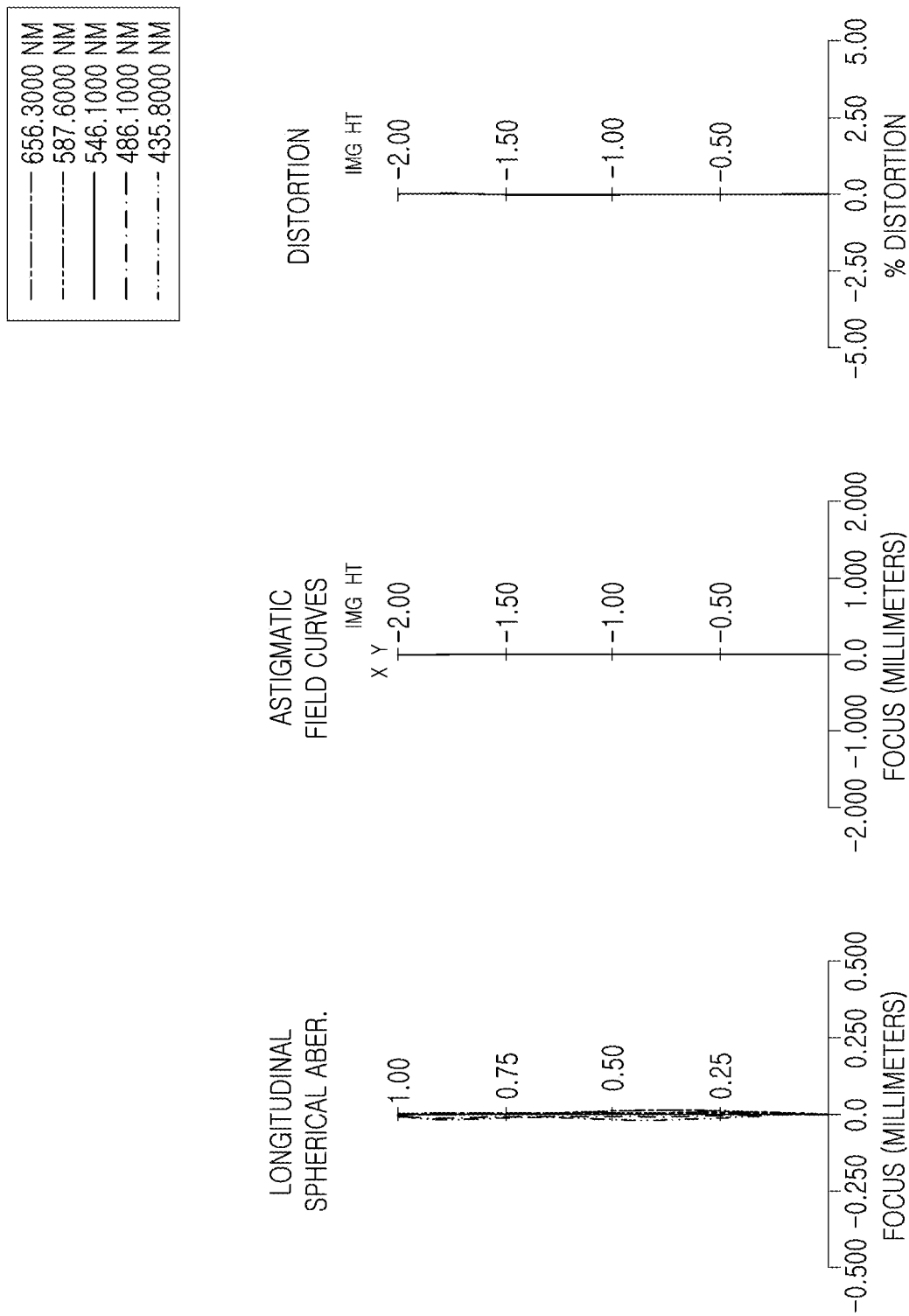
FIG. 8 is an aberration curve of the imaging lens system illustrated in FIG. 7.

The imaging lens system 400 configured as above may illustrate aberration characteristics illustrated in FIG. 8. Tables 7 and 8 each illustrate the lens characteristics and aspherical value of the imaging lens system according to this example embodiment.

TABLE 7

| Surface no. | Component | Radius of curvature | Thickness/ Distance | Refractive index | Abbe number |
|---|---|---|---|---|---|
| S1 | First lens | 5.96036 | 1.529 | 1.537 | 55.7 |
| S2 | | 237.688 | 0.351 | | |
| S3 | Second lens | −54.829 | 0.399 | 1.621 | 26.0 |
| S4 | | 10.602 | 0.257 | | |
| S5 | Third lens | 11.976 | 0.450 | 1.679 | 19.2 |
| S6 | | −472.747 | 0.113 | | |
| S7 | Fourth lens | 15.360 | 0.862 | 1.537 | 55.7 |
| S8 | | −36.1138 | 0.135 | | |
| S9 | Fifth lens | 49.7849 | 0.450 | 1.621 | 26.0 |
| S10 | | 5.30902 | 0.750 | | |
| S11 | Prism | Infinity | 2.500 | 1.519 | 64.2 |
| S12 | | Infinity | 3.000 | 1.519 | 64.2 |
| S13 | | Infinity | 3.750 | 1.519 | 64.2 |
| S14 | | Infinity | 3.750 | 1.519 | 64.2 |
| S15 | | Infinity | 0.318 | 1.519 | 64.2 |
| S16 | | Infinity | 3.200 | 1.519 | 64.2 |
| S17 | | Infinity | 2.600 | 1.519 | 64.2 |
| S18 | | Infinity | 0.450 | | |
| S19 | Filter | Infinity | 0.210 | 1.519 | 64.2 |
| S20 | | Infinity | 2.898 | | |
| S21 | Imaging plane | Infinity | 0.003 | | |

TABLE 8

| | Surface no. | | | | | | | | |
|---|---|---|---|---|---|---|---|---|---|
| | S1 | S2 | S3 | S4 | S5 | S6 | S7 | S8 | S9 | S10 |
| K | 0 | 0 | 0 | 0 | 0 | 0 | −1.418E+01 | 0 | 0 | 5.614E−01 |
| A | 0 | 0 | 0 | 0 | 0 | 0 | 1.897E−02 | 0 | 0 | −5.641E−03 |
| B | 0 | 0 | 0 | 0 | 0 | 0 | 3.404E−03 | 0 | 0 | −1.169E−02 |
| C | 0 | 0 | 0 | 0 | 0 | 0 | −2.238E−03 | 0 | 0 | 7.465E−03 |
| D | 0 | 0 | 0 | 0 | 0 | 0 | 0 | 0 | 0 | 2.819E−03 |
| E | 0 | 0 | 0 | 0 | 0 | 0 | 0 | 0 | 0 | 0 |
| F | 0 | 0 | 0 | 0 | 0 | 0 | 0 | 0 | 0 | 0 |
| G | 0 | 0 | 0 | 0 | 0 | 0 | 0 | 0 | 0 | 0 |
| H | 0 | 0 | 0 | 0 | 0 | 0 | 0 | 0 | 0 | 0 |
| J | 0 | 0 | 0 | 0 | 0 | 0 | 0 | 0 | 0 | 0 |

Figure 9:
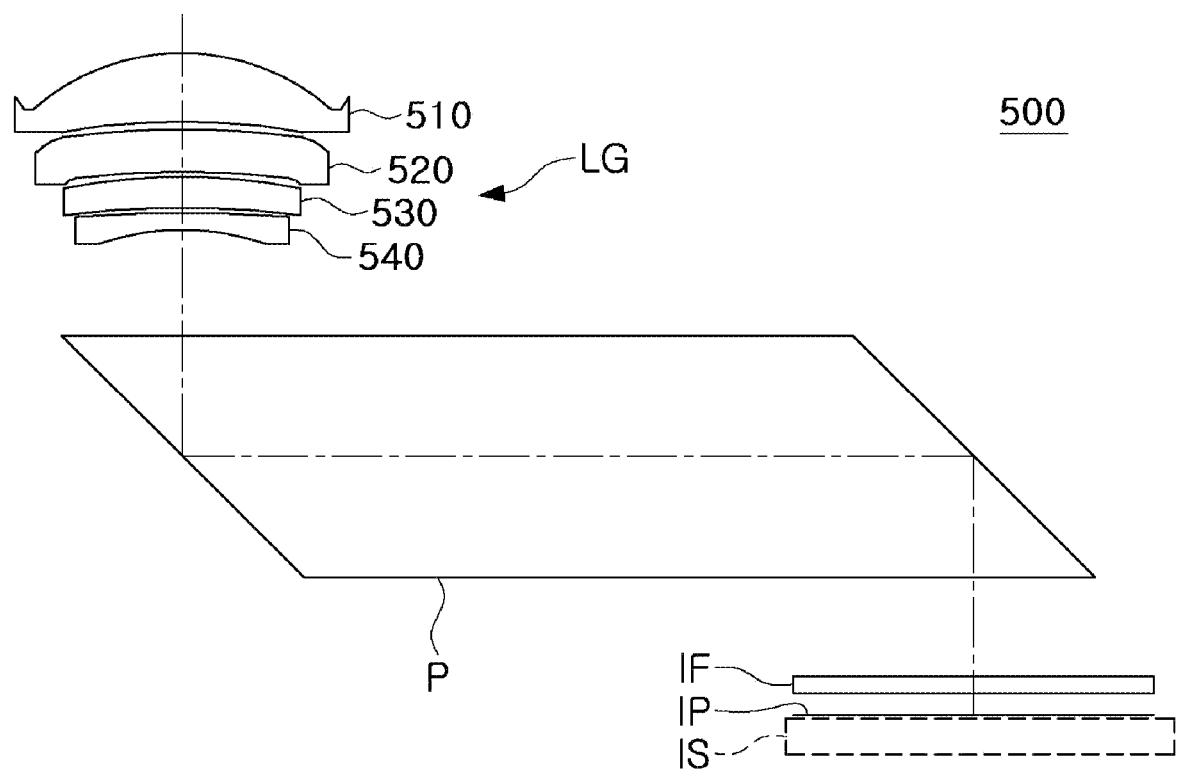
FIG. 9 is a configuration diagram of an imaging lens system according to a fifth example embodiment.

The present disclosure now describes an imaging lens system according to a fifth example embodiment with reference to FIG. 9.

An imaging lens system 500 according to this example embodiment may include a lens group LG and a prism P, which is one type of the optical path folding member. However, components of the imaging lens system 500 are not limited to the above-mentioned members. For example, the imaging lens system 500 may further include a filter IF and an imaging plane IP. The lens group LG and the prism P may be sequentially disposed from the object side. For example, the lens group LG may be disposed on an object side of the prism P, and the prism P may be disposed between the lens group LG and the imaging plane IP.

Next, examples of the above-mentioned components are described.

The lens group LG may include a plurality of lenses. For example, the lens group LG may include a first lens 510, a second lens 520, a third lens 530, and a fourth lens 540 sequentially arranged from the object side. The first lens 510 to the fourth lens 540 may be arranged at predetermined intervals. For example, an image-side surface of the first lens 510 may not be in contact with an object-side surface of the second lens 520, and an image-side surface of the second lens 520 may not be in contact with an object-side surface of the third lens 530. However, the first lens 510 to the fourth lens 540 may not necessarily be arranged to not be in contact with each other. For example, the image-side surface of the first lens 500 may be in contact with the object-side surface of the second lens 520, and the image-side surface of the second lens 520 may be in contact with the object-side surface of the third lens 530.

Next, characteristics of the first lens 510 to the fourth lens 540 are described according to one or more example embodiments of the present disclosure.

The first lens 510 may have positive refractive power, and have a convex object-side surface and a concave image-side surface. The second lens 520 may have positive refractive power, and have a convex object-side surface and a concave image-side surface. The third lens 530 may have positive refractive power, and have a convex object-side surface and a concave image-side surface. The fourth lens 540 may have negative refractive power, and have a convex object-side surface and a concave image-side surface.

Next, the present disclosure describes one or more examples of the prism P which may be the optical path folding member. For reference, the prism described below is an example of one type of the optical path folding member as described herein, and may be changed to another type of the optical path folding member.

The prism P may include a plurality of reflective surfaces. For example, the prism P may include a first reflective surface and a second reflective surface. The first reflective surface and the second reflective surface may be substantially parallel to each other. The first reflective surface and the second reflective surface may have a considerable distance therebetween. For example, the distance from the first reflective surface to the second reflective surface may be greater than the height ImgHT of the imaging plane. For another example, the distance from the first reflective surface to the second reflective surface may be greater than four times the height ImgHT of the imaging plane.

The filter IF and the imaging plane IP may be disposed adjacent to the exit surface of the prism P.

The filter IF may block light of a specific wavelength. For example, the filter IF according to this example embodiment may block infrared light. However, a type of light blocked by the filter IF is not limited to the infrared light. For example, the filter IF may block ultraviolet or visible light.

The imaging plane IP may be disposed at the point at which light reflected from the prism P converges or forms an image, and may be formed by an image sensor IS or the like. For example, the imaging plane IP may be formed on or inside the image sensor IS.

Figure 10:
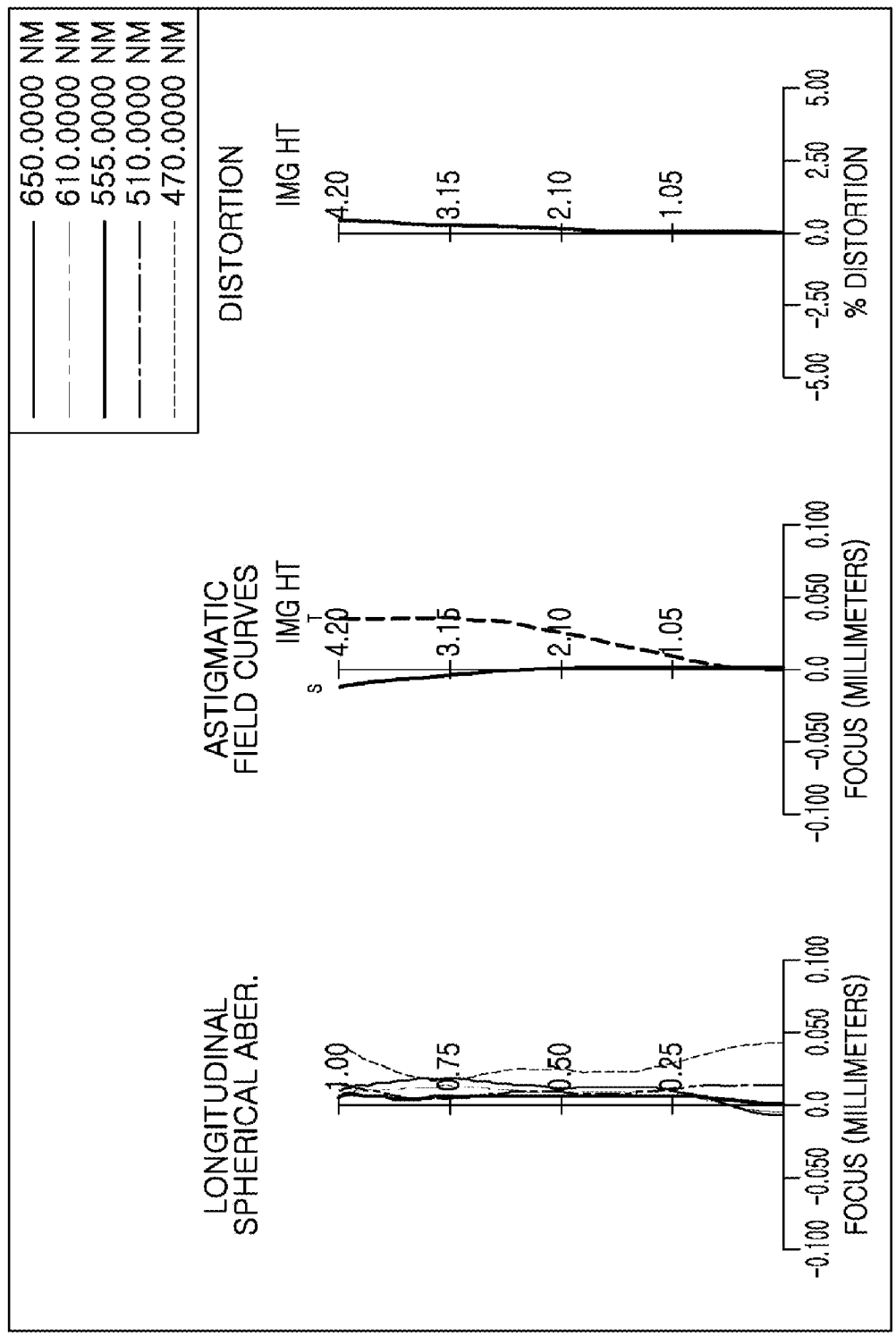
FIG. 10 is an aberration curve of the imaging lens system illustrated in FIG. 9.

The imaging lens system 500 configured as above may illustrate aberration characteristics illustrated in FIG. 10.

Tables 9 and 10 each illustrate the lens characteristics and aspherical value of the imaging lens system according to this example embodiment.

TABLE 9

| Surface no. | Component | Radius of curvature | Thickness/ Distance | Refractive index | Abbe number |
|---|---|---|---|---|---|
| S1 | First lens | 5.818 | 1.795 | 1.537 | 55.7 |
| S2 |  | 25.349 | 0.100 |  |  |
| S3 | Second lens | 20.693 | 1.159 | 1.667 | 20.3 |
| S4 |  | 26.185 | 0.100 |  |  |
| S5 | Third lens | 9.53363 | 0.811 | 1.537 | 55.7 |
| S6 |  | 15.1724 | 0.103 |  |  |
| S7 | Fourth lens | 28.8904 | 0.405 | 1.619 | 26.0 |
| S8 |  | 5.47386 | 1.500 |  |  |
| S9 | Prism | Infinity | 3.750 | 1.518 | 64.2 |
| S10 |  | Infinity | 17.250 | 1.518 | 64.2 |
| S11 |  | Infinity | 4.500 | 1.518 | 64.2 |
| S12 |  | Infinity | 0.300 |  |  |
| S13 | Filter | Infinity | 0.210 | 1.518 | 64.2 |
| S14 |  | Infinity | 0.295 |  |  |
| S15 | Imaging plane | Infinity | 0.005 |  |  |

TABLE 10

| Surface no. | S1 | S2 | S3 | S4 |
|---|---|---|---|---|
| K | 0.344928349 | 0 | 0 | −99 |
| A | 9.70164E−05 | −1.76601E−05 | 2.55457E−05 | −0.001531536 |
| B | 2.73181E−05 | −2.14958E−06 | 6.19014E−06 | 0.002042309 |
| C | −4.91204E−06 | −2.90562E−07 | 8.79374E−07 | −0.000863204 |
| D | 9.3407E−07 | −8.86232E−09 | 6.91697E−08 | 0.000207981 |
| E | −8.39693E−08 | 1.21392E−09 | 3.18914E−09 | −2.99433E−05 |
| F | 2.35343E−09 | 1.51258E−10 | 1.24428E−10 | 2.68181E−06 |
| G | −5.10444E−11 | −5.95195E−13 | 2.71575E−11 | −1.43975E−07 |
| H | 2.31185E−11 | −1.48893E−12 | 6.20088E−12 | 3.15609E−09 |
| J | −1.5758E−12 | −1.59842E−13 | 8.88953E−13 | 7.55353E−11 |

| Surface no. | S5 | S6 | S7 | S8 |
|---|---|---|---|---|
| K | −1.17E+01 | 0 | 0 | 5.900E−01 |
| A | −2.948E−03 | 6.24731E−05 | −0.000103984 | −1.125E−03 |
| B | 2.041E−03 | 1.08429E−05 | −1.15055E−05 | −1.025E−03 |
| C | −6.022E−04 | 1.98602E−06 | −1.68379E−06 | 1.389E−03 |
| D | −1.099E−05 | 2.64153E−07 | −2.29467E−07 | −9.991E−04 |
| E | 4.42323E−05 | 1.79879E−08 | −2.61396E−08 | 0.00039859 |
| F | −1.05033E−05 | −3.00074E−09 | −1.60817E−09 | −9.29334E−05 |
| G | 1.13117E−06 | −1.53564E−09 | 1.86611E−10 | 1.25407E−05 |
| H | −5.9262E−08 | −4.38528E−10 | −8.04452E−11 | −9.0042E−07 |
| J | 1.22222E−09 | −1.07522E−10 | −1.71932E−11 | 2.64504E−08 |

Tables 11 to 13 illustrate the optical characteristic values and conditional expression values of the imaging lens systems according to the above-described first to fifth example embodiments.

TABLE 11

| Item | First example embodiment | Second example embodiment | Third example embodiment | Fourth example embodiment | Fifth example embodiment |
|---|---|---|---|---|---|
| f | 15.000 | 13.992 | 16.420 | 23.000 | 27.188 |
| f1 | 7.576 | 7.417 | 7.502 | 11.357 | 13.637 |
| f2 | −9.689 | −9.948 | −9.229 | −14.283 | 136.425 |
| f3 | 11.615 | 12.564 | 11.233 | 17.196 | 45.523 |
| f4 | 14.761 | 12.649 | 17.517 | 20.182 | −10.978 |
| f5 | −7.102 | −6.483 | −7.370 | −9.613 | — |
| TTL | 18.736 | 16.878 | 20.827 | 27.975 | 32.283 |
| BFL | 16.034 | 13.634 | 18.163 | 23.429 | 26.310 |
| PL | 13.710 | 11.234 | 16.088 | 19.118 | 25.500 |
| TLG | 2.703 | 3.244 | 2.664 | 4.546 | 4.473 |
| ImgHT | 2.00 | 2.00 | 2.00 | 2.00 | 4.20 |
| V1 | 55.7 | 55.7 | 55.7 | 55.7 | 55.7 |
| V2 | 26.0 | 26.0 | 26.0 | 26.0 | 20.3 |
| fF | 7.576 | 7.417 | 7.502 | 11.357 | 13.637 |
| fR | −7.102 | −6.483 | −7.370 | −9.613 | −10.978 |
| LFS1 | 3.97648 | 3.94238 | 3.99514 | 5.96036 | 5.818 |
| LFS2 | 3.77351 | 3.51177 | 3.68013 | 5.30902 | 5.47386 |
| R1 | 3.97648 | 3.94238 | 3.99514 | 5.96036 | 5.818 |
| R10 | 3.77351 | 3.51177 | 3.68013 | 5.30902 | - |

TABLE 12

| Conditional expression | First example embodiment | Second example embodiment | Third example embodiment | Fourth example embodiment | Fifth example embodiment |
|---|---|---|---|---|---|
| BFL/TTL | 0.856 | 0.808 | 0.872 | 0.837 | 0.861 |
| V1 − V2 | 29.7 | 29.7 | 29.7 | 29.7 | 35.4 |
| f | 15.000 | 13.992 | 16.420 | 23.000 | 27.188 |
| TTL/f | 1.2491 | 1.2062 | 1.2685 | 1.2163 | 1.1874 |

TABLE 13

| Conditional expression | First example embodiment | Second example embodiment | Third example embodiment | Fourth example embodiment | Fifth example embodiment |
|---|---|---|---|---|---|
| f/f1 | 1.9799 | 1.8865 | 2.1887 | 2.0252 | 1.9937 |
| TTL/f | 1.2491 | 1.2062 | 1.2685 | 1.2163 | 1.1874 |
| f/PL | 1.0941 | 1.2455 | 1.0206 | 1.2031 | 1.0662 |
| (\|fF\| + \|fR\|)/PL | 1.0706 | 1.2373 | 0.9244 | 1.0969 | 0.9653 |
| fF/PL | 0.5526 | 0.6602 | 0.4663 | 0.5940 | 0.5348 |
| fR/PL | −0.5180 | −0.5771 | −0.4581 | −0.5028 | −0.4305 |
| LFS1/PL | 0.2900 | 0.3509 | 0.2483 | 0.3118 | 0.2282 |
| LRS2/PL | 0.2752 | 0.3126 | 0.2288 | 0.2777 | 0.2147 |
| (LFS1 + LRS2)/PL | 0.5653 | 0.6635 | 0.4771 | 0.5895 | 0.4428 |
| f1/PL | 0.5526 | 0.6602 | 0.4663 | 0.5940 | 0.5348 |
| f5/PL | −0.5180 | −0.5771 | −0.4581 | −0.5028 | - |
| (f1 + f2)/PL | −0.1541 | −0.2253 | −0.1073 | −0.1530 | 5.8848 |
| (f1 + f2 + f3)/PL | 0.6931 | 0.8931 | 0.5909 | 1.7464 | 7.6700 |
| (f1 + f2 + f3 + f4)/PL | 1.7697 | 2.0190 | 1.6797 | 1.8021 | 7.2395 |
| (f1 + f2 + f3 + f4 + f5)/PL | 1.2517 | 1.4420 | 1.2216 | 1.2992 | - |
| R1/PL | 0.2900 | 0.3509 | 0.2483 | 0.3118 | 0.2282 |
| R10/PL\| | 0.2752 | 0.3126 | 0.2288 | 0.2777 | — |
| (R1 + R10)/PL | 0.5653 | 0.6635 | 0.4771 | 0.5895 | — |
| TLG/PL | 0.1972 | 0.2888 | 0.1656 | 0.2378 | 0.1754 |
| ImgHT/PL | 0.1459 | 0.1780 | 0.1243 | 0.1046 | 0.1647 |
| (TTL + ImgHT)/PL | 1.5125 | 1.6803 | 1.4189 | 1.5679 | 1.4307 |
| (TTL + f)/PL | 2.4608 | 2.7478 | 2.3153 | 2.6663 | 2.3322 |

Next, an electronic device according to one or more example embodiments of the present disclosure is described with reference to FIG. 11.

The electronic device according to one or more example embodiments of the present disclosure may include the imaging lens system according to one or more example embodiments of the present disclosure. For example, the electronic device may include one or more of the imaging lens systems according to a first example embodiment to a fifth example embodiment. As a specific example, the electronic device may include the imaging lens system 100 according to a first example embodiment.

Figure 11:
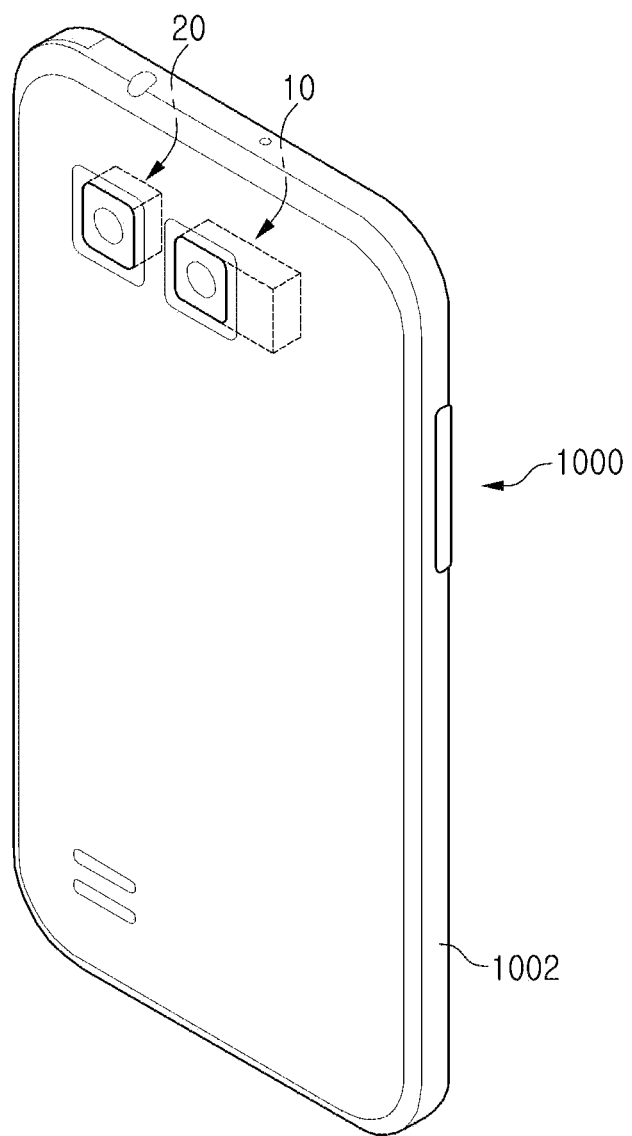
FIG. 11 is a perspective view of an electronic device according to an example embodiment.

The electronic device according to an example embodiment may be a portable terminal 1000 as illustrated in FIG. 11. However, a type of the electronic device is not limited to the portable terminal 1000. For example, the electronic device according to another example embodiment may be a laptop computer.

The portable terminal 1000 may include one or more camera modules 10 and 20. For example, two camera modules 10 and 20 may be installed in a body 1002 of the portable terminal 1000 at a predetermined interval. The first camera module 10 and the second camera module 20 may capture an object in the same direction. For example, the first camera module 10 and the second camera module 20 may be installed on one surface of the electronic device 1000 to be parallel to each other.

At least one of the first camera module 10 and the second camera module 20 may include the imaging lens system according to one of the first to fifth example embodiments. For example, the first camera module 10 may include the imaging lens system 100 according to a first example embodiment.

The first camera module 10 may capture an image of an object disposed at a long distance. In other words, a focal length of the first camera module 10 may be greater than a focal length of the second camera module 20.

As set forth above, one or more examples of the present disclosure may provide the imaging lens system which may be mounted in the small terminal or the thin terminal.

In addition, one or more examples of the present disclosure may provide the camera module having the telephoto imaging lens system.

While specific examples have been shown and described above, it will be apparent after an understanding of this disclosure that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

The invention claimed is:

1. An imaging lens system comprising:
    a lens group comprising a plurality of lenses sequentially disposed along an optical axis of the imaging lens system from an object-side surface of the lens group toward an imaging plane of the imaging lens system; and
    an optical path folding member disposed on the optical axis between an image-side surface of the lens group and the imaging plane,
    wherein the plurality of lenses comprise a fourth lens having a convex object-side surface in a paraxial region thereof, and
    1.52<(TTL+ImgHT)/PL<2.32, where TTL is a distance along the optical axis from the object-side surface of the lens group to the imaging plane, ImgHT is a height of the imaging plane, and PL is a distance along the optical axis from an incident surface of the optical path folding member to an exit surface of the optical path folding member.

2. The imaging lens system of claim 1, wherein 0.80<f/PL<2.0, where f is a focal length of the imaging lens system.

3. The imaging lens system of claim 1, wherein 0.80<(\|fF\|+\|fR\|)/PL<2.40, where fF is a focal length of a frontmost lens disposed closest to an object in the lens group, and fR is a focal length of a rearmost lens disposed closest to the imaging plane in the lens group.

4. The imaging lens system of claim 1, wherein 0.40<fF/PL<1.0, where fF is a focal length of a frontmost lens disposed closest to an object in the lens group.

5. The imaging lens system of claim 1, wherein 0.20<LFS1/PL <0.60, where LFS1 is a radius of curvature on the optical axis of an object-side surface of a frontmost lens disposed closest to an object in the lens group.

6. The imaging lens system of claim 1, wherein 0.20<LRS2/PL<0.60, where LRS2 is a radius of curvature on the optical axis of an image-side surface of a rearmost lens disposed closest to the imaging plane in the lens group.

7. The imaging lens system of claim 1, wherein 0.40<(LFS1+LRS2)/PL<0.90, where LFS1 is a radius of curvature on the optical axis of an object-side surface of a frontmost lens disposed closest to an object in the lens group, and LRS2 is a radius of curvature on the optical axis of an image-side surface of a rearmost lens disposed closest to the imaging plane in the lens group.

8. The imaging lens system of claim 1, wherein 0.10<TLG/PL<0.40, where TLG is a distance along the optical axis from an object-side surface of a frontmost lens disposed closest to an object in the lens group to an image-side surface of a rearmost lens disposed closest to the imaging plane in the lens group.

9. The imaging lens system of claim 1, wherein 1.2<TTL/f<1.4, where f is a focal length of the imaging lens system.

10. An electronic device comprising:
one or more camera modules,
wherein at least one camera module among the one or more camera modules comprises the imaging lens system of claim 1.

11. An imaging lens system comprising:
a lens group comprising a total of five lenses with refractive power, the five lenses comprising a first lens, a second lens, a third lens having a convex image-side surface in a paraxial region thereof, a fourth lens having a convex object-side surface in a paraxial region thereof and a convex image-side surface in a paraxial region thereof, and a fifth lens having a convex object-side surface in a paraxial region thereof sequentially disposed in ascending numerical order along an optical axis of the imaging lens system from an object-side surface of the first lens toward an imaging plane of the imaging lens system; and
an optical path folding member disposed on the optical axis between an image-side surface of the fifth lens and the imaging plane and comprising four or more reflective surfaces,
wherein $-0.86<f5/PL<-0.46$, where f5 is a focal length of the fifth lens, and PL is a distance along the optical axis from an incident surface of the optical path folding member to an exit surface of the optical path folding member.

12. The imaging lens system of claim 11, wherein 0.5<f1/PL<0.9, where f1 is a focal length of the first lens.

13. The imaging lens system of claim 11, wherein $-0.40<(f1+f2)/PL<-0.10$, where f1 is a focal length of the first lens, and f2 is a focal length of the second lens.

14. The imaging lens system of claim 11, wherein 0.60<(f1+f2+f3)/PL<1.20, where f1 is a focal length of the first lens, f2 is a focal length of the second lens, and f3 is a focal length of the third lens.

15. The imaging lens system of claim 11, wherein 1.60<(f1+f2+f3+f4)/PL<2.60, where f1 is a focal length of the first lens, f2 is a focal length of the second lens, f3 is a focal length of the third lens, and f4 is a focal length of the fourth lens.

16. The imaging lens system of claim 11, wherein 1.60<(f1+f2+f3+f4+f5)/PL<2.0, where f1 is a focal length of the first lens, f2 is a focal length of the second lens, f3 is a focal length of the third lens, and f4 is a focal length of the fourth lens.

17. An electronic device comprising:
one or more camera modules,
wherein at least one camera module among the one or more camera modules comprises the imaging lens system of claim 11.

18. An imaging lens system comprising:
a lens group comprising a first lens, a second lens, a third lens, a fourth lens having a positive refractive power, and a fifth lens having a negative refractive power and a convex object-side surface in a paraxial region thereof sequentially disposed in ascending numerical order along an optical axis of the imaging lens system from an object-side surface of the first lens toward an imaging plane of the imaging lens system; and
an optical path folding member disposed on the optical axis between an image-side surface of the fifth lens and the imaging plane,
wherein 0.7<BFL/TTL, where BFL is a distance along the optical axis from the image-side surface of the fifth lens to the imaging plane, and TTL is a distance along the optical axis from the object-side surface of the first lens to the imaging plane.

19. An electronic device comprising:
one or more camera modules,
wherein at least one camera module among the one or more camera modules comprises the imaging lens system of claim 18.

* * * * *